(12) United States Patent
Karkow et al.

(10) Patent No.: US 10,808,927 B2
(45) Date of Patent: Oct. 20, 2020

(54) PRE-MIXED FUEL BURNER WITH PERFORATED FLAME HOLDER

(71) Applicant: ClearSign Combustion Corporation, Seattle, WA (US)

(72) Inventors: Douglas W. Karkow, Des Moines, WA (US); Joseph Colannino, Bellevue, WA (US); Robert E. Breidenthal, Seattle, WA (US); Christopher A. Wiklof, Everett, WA (US)

(73) Assignee: CLEARSIGN TECHNOLOGIES CORPORATION, Seattle, WA (US)

( * ) Notice: Subject to any disclaimer, the term of this patent is extended or adjusted under 35 U.S.C. 154(b) by 867 days.

(21) Appl. No.: 15/091,906

(22) Filed: Apr. 6, 2016

(65) Prior Publication Data

US 2016/0298838 A1    Oct. 13, 2016

Related U.S. Application Data

(63) Continuation of application No. PCT/US2014/059580, filed on Oct. 7, 2014, which is
(Continued)

(51) Int. Cl.
*F23C 5/00* (2006.01)
*F23D 14/02* (2006.01)
(Continued)

(52) U.S. Cl.
CPC ............... *F23D 14/02* (2013.01); *F23C 6/04* (2013.01); *F23C 9/06* (2013.01); *F23D 14/14* (2013.01); *F23D 14/26* (2013.01); *F23D 14/62* (2013.01); *F23D 14/82* (2013.01); *F23N 1/022* (2013.01); *F23N 5/006* (2013.01); *F23C 2201/00* (2013.01); *F23C 2202/10* (2013.01); *F23C 2202/50* (2013.01); *F23D 2207/00* (2013.01); *F23N 2227/02* (2020.01); *F23N 2227/38* (2020.01); *Y02T 50/60* (2013.01)

(58) Field of Classification Search
CPC .................................. F23C 6/04; F23D 14/02
See application file for complete search history.

(56) References Cited

U.S. PATENT DOCUMENTS 2,095,065 A    10/1937  Hays
2,635,813 A    4/1953   Schlenz
(Continued)

FOREIGN PATENT DOCUMENTS

CN    101046304    10/2007
EP    0415008      3/1991
(Continued)

OTHER PUBLICATIONS

EPO Extended Search Report and Search Opinion of EP Application No. 14852454.9 dated Apr. 28, 2017.
(Continued)

*Primary Examiner* — Jason Lau
(74) *Attorney, Agent, or Firm* — Christopher A. Wiklof; Nicholas S. Bromer; Launchpad IP, Inc.

(57) ABSTRACT

A combustion system such as a furnace or boiler includes a perforated reaction holder configured to hold a combustion reaction that produces very low oxides of nitrogen (NOx).

25 Claims, 20 Drawing Sheets

Related U.S. Application Data a continuation of application No. PCT/US2014/016632, filed on Feb. 14, 2014.

(60) Provisional application No. 61/887,741, filed on Oct. 7, 2013, provisional application No. 61/895,361, filed on Oct. 24, 2013.

(51) Int. Cl.

| | | |
|---|---|---|
| F23D 14/26 | (2006.01) | |
| F23C 9/06 | (2006.01) | |
| F23N 1/02 | (2006.01) | |
| F23N 5/00 | (2006.01) | |
| F23D 14/82 | (2006.01) | |
| F23C 6/04 | (2006.01) | |
| F23D 14/14 | (2006.01) | |
| F23D 14/62 | (2006.01) | |

(56) References Cited

U.S. PATENT DOCUMENTS

| | | | |
|---|---|---|---|
| 3,008,513 A | 11/1961 | Holden | |
| 3,155,142 A * | 11/1964 | Stack | F23C 99/00 |
| | | | 431/328 |
| 3,324,924 A | 6/1967 | Hailstone et al. | |
| 3,847,536 A | 11/1974 | Lepage | |
| 4,021,188 A | 5/1977 | Yamagishi et al. | |
| 4,071,958 A | 4/1978 | Schelp | |
| 4,443,182 A * | 4/1984 | Wojcieson | F23C 7/00 |
| | | | 239/406 |
| 4,483,673 A | 11/1984 | Murai et al. | |
| 4,519,770 A | 5/1985 | Kesselring et al. | |
| 4,588,373 A | 5/1986 | Tonon et al. | |
| 4,643,667 A | 2/1987 | Fleming | |
| 4,673,349 A | 6/1987 | Abe et al. | |
| 4,752,213 A | 6/1988 | Grochowski et al. | |
| 4,899,696 A | 2/1990 | Kennedy et al. | |
| 4,919,609 A | 4/1990 | Sarkisian et al. | |
| 5,235,667 A | 8/1993 | Canfield et al. | |
| 5,326,257 A | 7/1994 | Taylor et al. | |
| 5,380,192 A | 1/1995 | Hamos | |
| 5,409,375 A | 4/1995 | Butcher | |
| 5,431,557 A | 7/1995 | Hamos | |
| 5,439,372 A | 8/1995 | Duret et al. | |
| 5,441,402 A | 8/1995 | Reuther et al. | |
| 5,511,516 A | 4/1996 | Moore, Jr. et al. | |
| 5,522,723 A | 6/1996 | Durst et al. | |
| 5,641,282 A | 6/1997 | Lee et al. | |
| 5,685,708 A | 11/1997 | Palmer-Jones | |
| 5,718,573 A | 2/1998 | Knight et al. | |
| 5,749,721 A | 5/1998 | Klinge et al. | |
| 5,899,686 A | 5/1999 | Carbone et al. | |
| 5,957,682 A | 9/1999 | Kamal et al. | |
| 5,993,192 A | 11/1999 | Schmidt et al. | |
| 6,065,963 A | 5/2000 | Dewaegheneire et al. | |
| 6,159,001 A | 12/2000 | Kushch et al. | |
| 6,210,151 B1 | 4/2001 | Joshi et al. | |
| 6,752,620 B2 | 6/2004 | Heier et al. | |
| 6,997,701 B2 | 2/2006 | Volkert et al. | |
| 7,410,288 B1 | 8/2008 | Kelso et al. | |
| 7,666,367 B1 | 2/2010 | Durst et al. | |
| 8,851,882 B2 | 10/2014 | Hartwick et al. | |
| 8,881,535 B2 | 11/2014 | Hartwick et al. | |
| 8,911,699 B2 | 12/2014 | Colannino et al. | |
| 9,151,549 B2 | 10/2015 | Goodson et al. | |
| 9,209,654 B2 | 12/2015 | Colannino et al. | |
| 9,243,800 B2 | 1/2016 | Goodson et al. | |
| 9,267,680 B2 | 2/2016 | Goodson et al. | |
| 9,284,886 B2 | 3/2016 | Breidenthal et al. | |
| 9,289,780 B2 | 3/2016 | Goodson | |
| 9,310,077 B2 | 4/2016 | Breidenthal et al. | |
| 9,366,427 B2 | 6/2016 | Sonnichsen et al. | |
| 9,371,994 B2 | 6/2016 | Goodson et al. | |
| 9,377,188 B2 | 6/2016 | Ruiz et al. | |
| 9,377,189 B2 | 6/2016 | Ruiz et al. | |
| 9,377,190 B2 | 6/2016 | Karkow et al. | |
| 9,377,195 B2 | 6/2016 | Goodson et al. | |
| 9,388,981 B2 | 7/2016 | Karkow et al. | |
| 2002/0155403 A1 | 10/2002 | Griffin et al. | |
| 2003/0054313 A1 | 3/2003 | Rattner et al. | |
| 2004/0058290 A1 * | 3/2004 | Mauzey | F23D 11/102 |
| | | | 431/243 |
| 2004/0081933 A1 | 4/2004 | St. Charles et al. | |
| 2004/0152028 A1 | 8/2004 | Singh et al. | |
| 2005/0106520 A1 | 5/2005 | Cornwell et al. | |
| 2006/0008755 A1 * | 1/2006 | Leinemann | A62C 4/02 |
| | | | 431/346 |
| 2006/0292510 A1 * | 12/2006 | Krauklis | F23D 14/145 |
| | | | 431/326 |
| 2008/0131824 A1 | 6/2008 | Wahl et al. | |
| 2010/0126175 A1 | 5/2010 | Kim et al. | |
| 2010/0178219 A1 | 7/2010 | Verykios et al. | |
| 2011/0044868 A1 | 2/2011 | Lee et al. | |
| 2012/0164590 A1 | 6/2012 | Mach | |
| 2012/0231398 A1 | 9/2012 | Carpentier et al. | |
| 2013/0071794 A1 | 3/2013 | Colannino et al. | |
| 2013/0230810 A1 | 9/2013 | Goodson et al. | |
| 2013/0260321 A1 | 10/2013 | Colannino et al. | |
| 2013/0323655 A1 | 12/2013 | Krichtafovitch et al. | |
| 2013/0323661 A1 | 12/2013 | Goodson et al. | |
| 2013/0333279 A1 | 12/2013 | Osler et al. | |
| 2013/0336352 A1 | 12/2013 | Colannino et al. | |
| 2014/0051030 A1 | 2/2014 | Colannino et al. | |
| 2014/0065558 A1 | 3/2014 | Colannino et al. | |
| 2014/0076212 A1 | 3/2014 | Goodson et al. | |
| 2014/0080070 A1 | 3/2014 | Krichtafovitch et al. | |
| 2014/0162195 A1 | 6/2014 | Lee et al. | |
| 2014/0162196 A1 | 6/2014 | Krichtafovitch et al. | |
| 2014/0162197 A1 | 6/2014 | Krichtafovitch et al. | |
| 2014/0162198 A1 | 6/2014 | Krichtafovitch et al. | |
| 2014/0170569 A1 | 6/2014 | Anderson et al. | |
| 2014/0170571 A1 | 6/2014 | Casasanta, III et al. | |
| 2014/0170575 A1 | 6/2014 | Krichtafovitch | |
| 2014/0170576 A1 | 6/2014 | Colannino et al. | |
| 2014/0170577 A1 | 6/2014 | Colannino et al. | |
| 2014/0186778 A1 | 7/2014 | Colannino et al. | |
| 2014/0196368 A1 | 7/2014 | Wiklof | |
| 2014/0196369 A1 | 7/2014 | Wiklof | |
| 2014/0208758 A1 | 7/2014 | Breidenthal et al. | |
| 2014/0212820 A1 | 7/2014 | Colannino et al. | |
| 2014/0216401 A1 | 8/2014 | Colannino et al. | |
| 2014/0227645 A1 | 8/2014 | Krichtafovitch et al. | |
| 2014/0227646 A1 | 8/2014 | Krichtafovitch et al. | |
| 2014/0227649 A1 | 8/2014 | Krichtafovitch et al. | |
| 2014/0248566 A1 | 9/2014 | Krichtafovitch et al. | |
| 2014/0255855 A1 | 9/2014 | Krichtafovitch | |
| 2014/0255856 A1 | 9/2014 | Colannino et al. | |
| 2014/0272730 A1 | 9/2014 | Krichtafovitch et al. | |
| 2014/0272731 A1 | 9/2014 | Breidenthal et al. | |
| 2014/0287368 A1 | 9/2014 | Krichtafovitch et al. | |
| 2014/0295094 A1 | 10/2014 | Casasanta, III | |
| 2014/0295360 A1 | 10/2014 | Wiklof | |
| 2014/0335460 A1 | 11/2014 | Wiklof et al. | |
| 2015/0079524 A1 | 3/2015 | Colannino et al. | |
| 2015/0104748 A1 | 4/2015 | Dumas et al. | |
| 2015/0107260 A1 | 4/2015 | Colannino et al. | |
| 2015/0118629 A1 | 4/2015 | Colannino et al. | |
| 2015/0121890 A1 | 5/2015 | Colannino et al. | |
| 2015/0140498 A1 | 5/2015 | Colannino | |
| 2015/0147704 A1 | 5/2015 | Krichtafovitch et al. | |
| 2015/0147705 A1 | 5/2015 | Colannino et al. | |
| 2015/0147706 A1 | 5/2015 | Krichtafovitch et al. | |
| 2015/0219333 A1 | 8/2015 | Colannino et al. | |
| 2015/0226424 A1 | 8/2015 | Breidenthal et al. | |
| 2015/0241057 A1 | 8/2015 | Krichtafovitch et al. | |
| 2015/0276211 A1 | 10/2015 | Colannino et al. | |
| 2015/0276217 A1 | 10/2015 | Karkow et al. | |
| 2015/0276220 A1 | 10/2015 | Karkow et al. | |
| 2015/0285491 A1 | 10/2015 | Karkow et al. | |
| 2015/0316261 A1 | 11/2015 | Karkow et al. | |
| 2015/0330625 A1 | 11/2015 | Karkow et al. | |
| 2015/0338089 A1 | 11/2015 | Krichtafovitch et al. | |
| 2015/0345780 A1 | 12/2015 | Krichtafovitch | |

(56) References Cited

U.S. PATENT DOCUMENTS

| | | |
|---|---|---|
| 2015/0345781 A1 | 12/2015 | Krichtafovitch et al. |
| 2015/0362177 A1 | 12/2015 | Krichtafovitch et al. |
| 2015/0362178 A1 | 12/2015 | Karkow et al. |
| 2015/0369476 A1 | 12/2015 | Wiklof |
| 2015/0369477 A1 | 12/2015 | Karkow et al. |
| 2016/0003471 A1 | 1/2016 | Karkow et al. |
| 2016/0018103 A1 | 1/2016 | Karkow et al. |
| 2016/0025333 A1 | 1/2016 | Karkow et al. |
| 2016/0025374 A1 | 1/2016 | Karkow et al. |
| 2016/0025380 A1 | 1/2016 | Karkow et al. |
| 2016/0033125 A1 | 2/2016 | Krichtafovitch et al. |
| 2016/0040872 A1 | 2/2016 | Colannino et al. |
| 2016/0046524 A1 | 2/2016 | Colannino et al. |
| 2016/0047542 A1 | 2/2016 | Wiklof et al. |
| 2016/0091200 A1 | 3/2016 | Colannino et al. |
| 2016/0123576 A1 | 5/2016 | Colannino et al. |
| 2016/0138800 A1 | 5/2016 | Anderson et al. |
| 2016/0161110 A1 | 6/2016 | Krichtafovitch et al. |
| 2016/0161115 A1 | 6/2016 | Krichtafovitch et al. |
| 2016/0175851 A1 | 6/2016 | Colannino et al. |

FOREIGN PATENT DOCUMENTS

| | | |
|---|---|---|
| EP | 0478305 | 12/1997 |
| EP | 1916477 | 4/2008 |
| EP | 2738460 | 6/2014 |
| FR | 1375471 | 10/1964 |
| GB | 19490 | 8/1913 |
| GB | 2456861 | 7/2009 |
| JP | S 62-233639 | 10/1987 |
| JP | 2001-349514 | 12/2001 |
| JP | 2006-275482 | 10/2006 |
| WO | WO 1995/000803 | 1/1995 |
| WO | WO 2015/017084 | 2/2015 |
| WO | WO 2015/042566 | 3/2015 |
| WO | Wo 2015/042614 | 3/2015 |
| WO | WO 2015/042615 | 3/2015 |
| WO | WO 2015/051136 | 4/2015 |
| WO | WO 2015/051377 | 4/2015 |
| WO | WO 2015/057740 | 4/2015 |
| WO | WO 2015/061760 | 4/2015 |
| WO | WO 2015/070188 | 5/2015 |
| WO | WO 2015/089306 | 6/2015 |
| WO | WO 2015/103436 | 7/2015 |
| WO | WO 2015/112950 | 7/2015 |
| WO | WO 2015/123149 | 8/2015 |
| WO | WO 2015/123381 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/003883 | 1/2016 |
| WO | WO 2016/007564 | 1/2016 |
| WO | WO 2016/018610 | 2/2016 |

OTHER PUBLICATIONS

Arnold Schwarzenegger, "A Low NOx Porous Ceramics Burner Performance Study," California Energy Commission Public Interest Energy Research Program, Dec. 2007, San Diego State University Foundation, p. 5.

Takeno, Abstract, Combustion Institute 1982, 1 page.

PCT International Search Report and Written Opinion of International PCT Application No. PCT/US2014/059580 dated Jan. 2, 2015.

Howell, J.R., et al.; "Combustion of Hydrocarbon Fuels Within Porous Inert Media," Dept. of Mechanical Engineering, The University of Texas at Austin. Prog. Energy Combust. Sci., 1996, vol. 22, p. 121-145.

EPO Office Action dated Feb. 6, 2019 for European Patent Application No. 14852454.9.

PCT International Search Report and Written Opinion dated May 26, 2014 for International PCT Application No. PCT/US2014/016632 filed Feb. 14, 2014, 27 pages.

Friedman et al., "The Wall-Quenching of Laminar Propane Flames as a Function of Pressure, and Air-Fuel Ratio," Journal of Applied Physics, vol. 21, No. 8, Aug. 1, 1950, pp. 791-795.

Yang et al., "A Surface Analysis-Based Investigation of the Effect of Wall Materials on Flame Quenching," Combustion Science and Technology, vol. 183, No. 5, Feb. 17, 2011, pp. 444-458.

European Office Action dated Oct. 16, 2019, for EP Application No. 14852454.9, 7 pages.

* cited by examiner

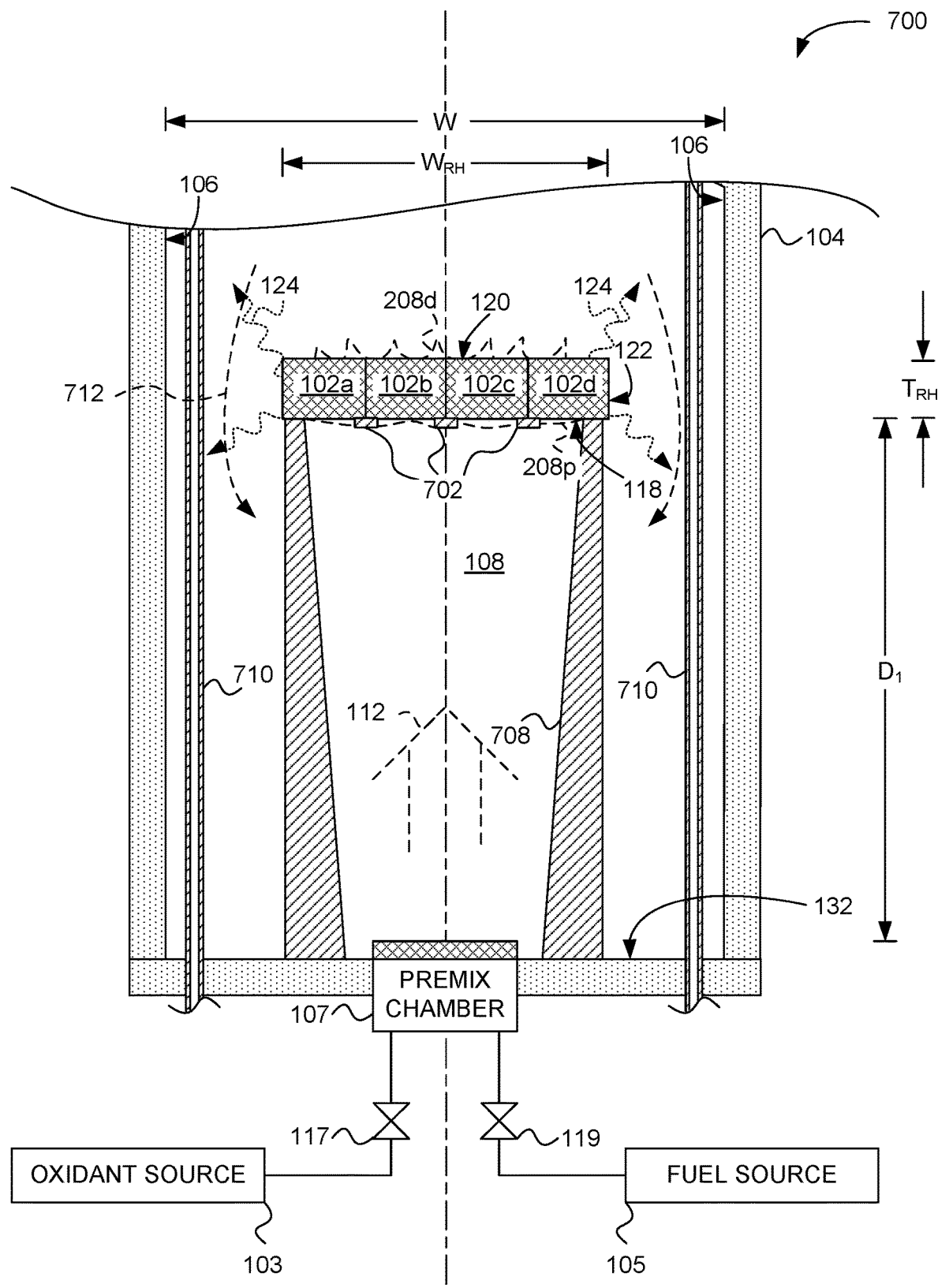

PRE-MIXED FUEL BURNER WITH PERFORATED FLAME HOLDER

CROSS-REFERENCE TO RELATED APPLICATIONS

The present application is a U.S. Continuation Application which claims priority benefit under 35 U.S.C. § 120 of International Patent Application No. PCT/US2014/059580, entitled "PRE-MIXED FUEL BURNER WITH PERFORATED FLAME HOLDER," filed Oct. 7, 2014, which application claims priority benefit from U.S. Provisional Patent Application No. 61/887,741, entitled, "POROUS FLAME HOLDER FOR LOW NOx COMBUSTION," filed Oct. 7, 2013, which application claims priority benefit from U.S. Provisional Patent Application No. 61/895,361 entitled, "SYSTEM AND METHOD INCLUDING A PERFORATED FLAME HOLDER CONFIGURED TO TRANSFER HEAT FROM A COMBUSTION REACTION TO A WORKING FLUID," filed Oct. 24, 2013, and which application is a Continuation of PCT Patent Application No. PCT/US2014/016632, entitled, "FUEL COMBUSTION SYSTEM WITH A PERFORATED REACTION HOLDER," filed Feb. 14, 2014, each of which, to the extent not inconsistent with the disclosure herein, is incorporated herein by reference.

BACKGROUND

Industrial and commercial burners are used across a broad range of applications, including process heat sources, flame treatment systems, steam boilers for electrical power generation, and hot gas sources for gas turbines. Collectively, industrial and commercial burners are a significant source of air pollution. Notwithstanding pollutants released by fuel, flames produced by even "clean-burning" fuels such as hydrogen, hydrocarbon gases, and pure hydrocarbon liquids produce pollutants such as oxides of nitrogen (collectively referred to as "NOx" herein). Hydrocarbon fuels can further release carbon monoxide (CO), and fuel slip into the atmosphere.

In a conventional combustion system typical of industrial and commercial burners, the combustion reaction is relatively uncontrolled. That is, a flame can vary in conformation such that its shape and location at any particular point in time is unpredictable. This unpredictability, combined with high peak temperatures encountered especially at the stoichiometric interface (the visible surface) in a diffusion flame can cause operational problems such as coking of reaction tubes and/or uneven heating of steam tubes. Moreover, the length of a conventional flame causes a relatively long residence time during which combustion air (including molecular nitrogen) is subject to high temperature.

What is needed is a technology for reducing pollutants released by combustion systems such as industrial and commercial burners. What is also needed is a technology that can improve flame control in such systems.

SUMMARY

According to an embodiment, a combustion system includes a premix chamber configured to receive an oxidant and a fuel, the premix chamber is configured to provide an oxidant-fuel mixture into a chamber volume. The combustion system may include a perforated reaction holder positioned within the chamber volume. The perforated reaction holder may be displaced from the premix chamber and aligned with the premix chamber to receive the oxidant-fuel mixture. The perforated reaction holder may carry a combustion reaction while at least part of the oxidant-fuel mixture combusts.

According to one embodiment, a method of generating a combustion reaction includes receiving a hydrocarbon fuel and an oxidant in a premix chamber, according to one embodiment. The method may include mixing the hydrocarbon fuel with vortices caused by receipt of the hydrocarbon fuel and the oxidant in the premix chamber, to generate an oxidant-fuel mixture. The method may include delivering the oxidant-fuel mixture into a chamber volume to enable combustion of the oxidant-fuel mixture by a perforated reaction holder. The perforated reaction holder may be separated from the premix chamber by a predetermined distance. The method may include maintaining the combustion reaction with a plurality of perforations through the perforated reaction holder, by receiving the oxidant-fuel mixture at an inlet surface of the perforated reaction holder, and by releasing flue gases at an outlet surface of the perforated reaction holder.

BRIEF DESCRIPTION OF THE DRAWINGS

FIG. 7A is a simplified side sectional view of a furnace including a perforated reaction holder, according to an embodiment.

DETAILED DESCRIPTION

Figure 1A:
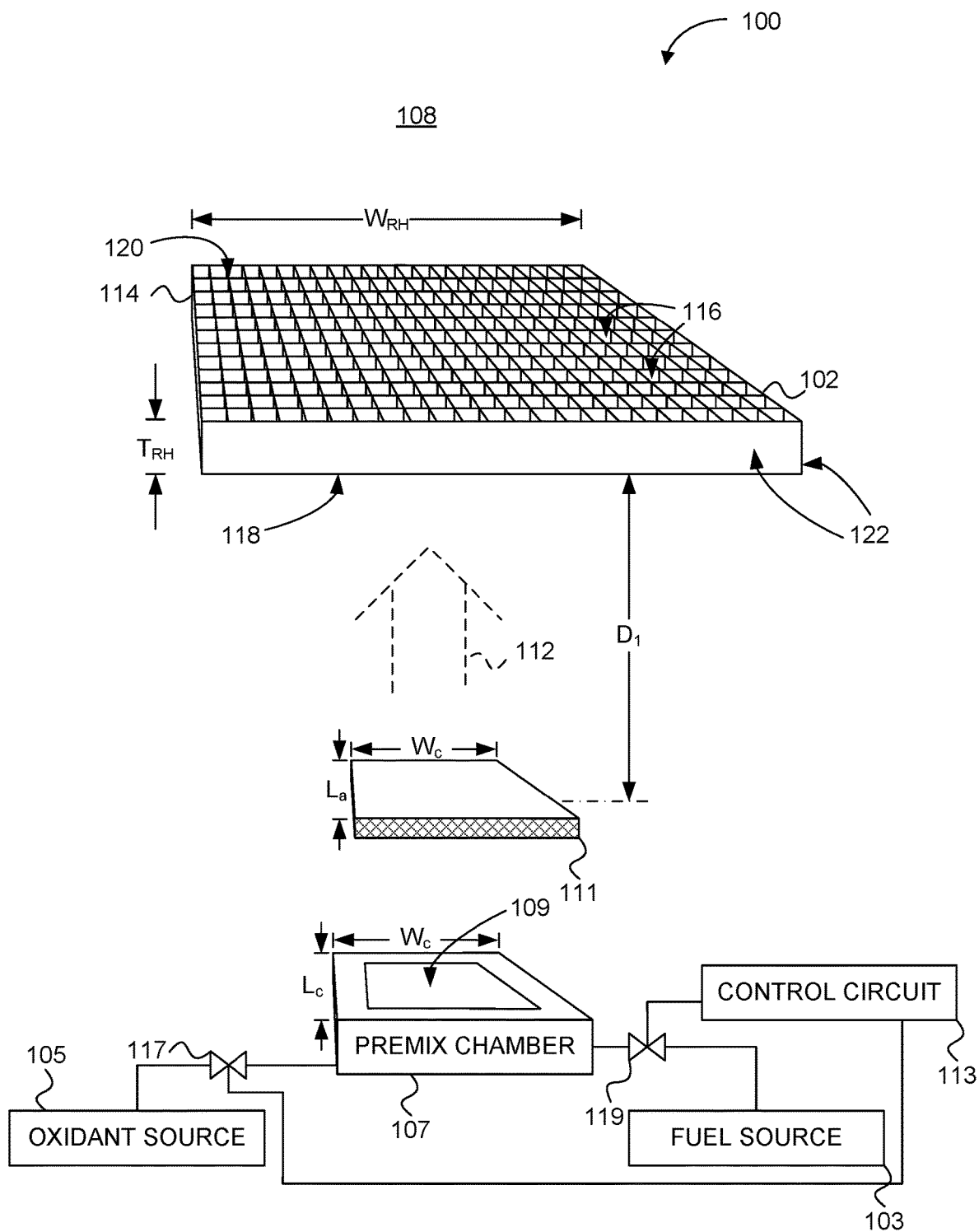
FIG. 1A is a simplified perspective view of a burner system including a perforated reaction holder, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

The inventors recognize that to minimize output of oxides of nitrogen (NOx) it is desirable to 1) minimize the peak flame temperature, and 2) minimize residence time at the peak flame temperature. Heretofore, technologies to minimize flame temperature have been unavailable or expensive and complex. Technologies to minimize residence time have similarly been unavailable or expensive and complex.

According to embodiments described and claimed herein, a burner system is equipped with a perforated reaction holder configured to support lean combustion that both minimizes peak flame temperature and reduces residence time at the flame temperature. Experiments have yielded NOx concentration in low single digit parts per million in a pilot scale apparatuses.

Figure 1B:
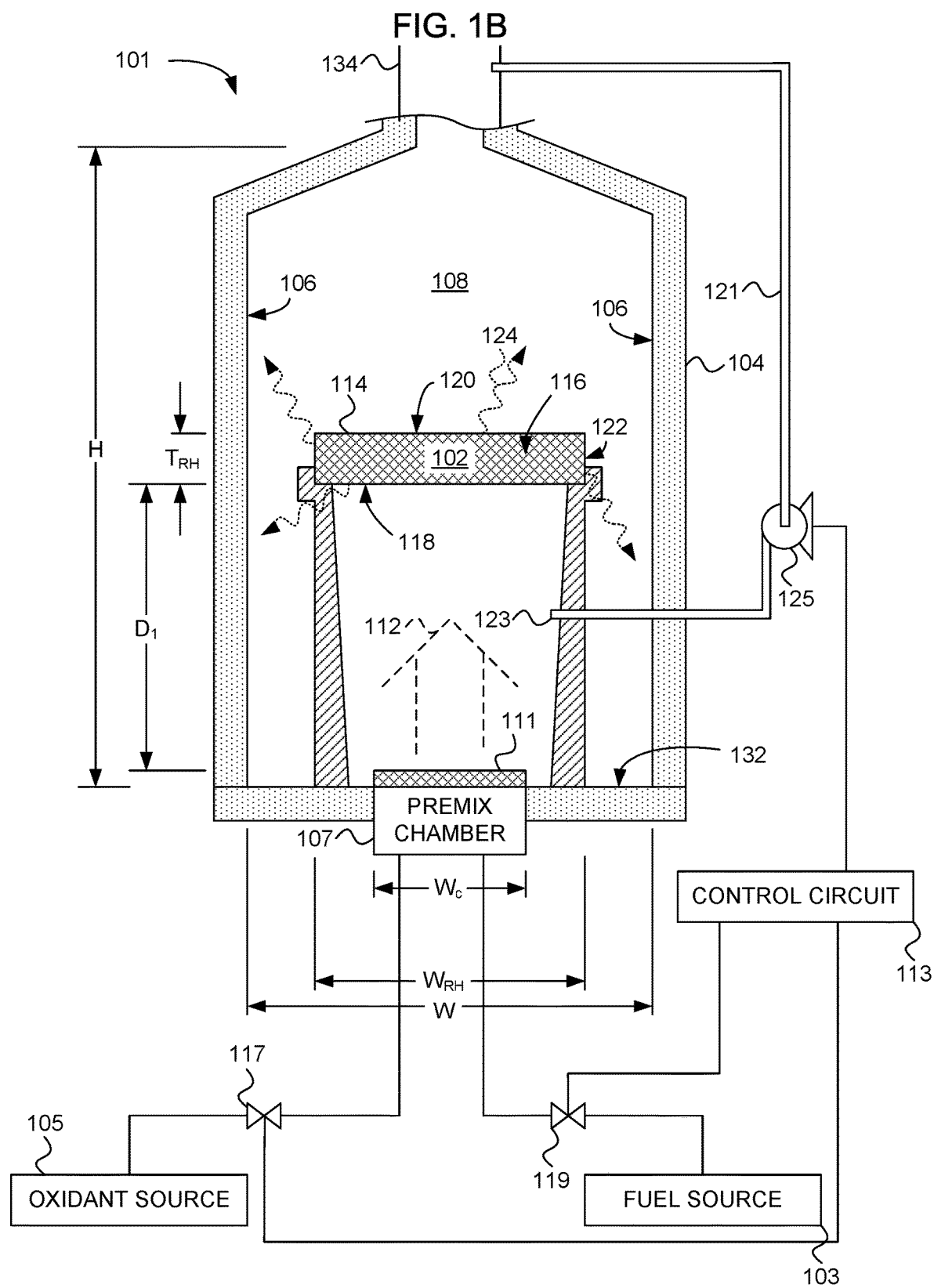
FIG. 1B is a simplified side sectional view of the burner system of FIG. 1A, according to an embodiment.

FIG. 1A is a simplified perspective view of a burner system 100 including a perforated reaction holder 102, according to an embodiment. FIG. 1B is a simplified side sectional view of a combustion system 101 that incorporates the burner system 100 of FIG. 1A, according to an embodiment. Referring to FIGS. 1A and 1B, the burner system 100 includes a fuel source 103 and an oxidant source 105, e.g., an air blower, operably coupled to a premix chamber 107 for mixing the fuel source 103 and the oxidant source 105 into an oxidant-fuel mixture. The oxidant-fuel mixture can enable the perforated reaction holder 102 to carry a combustion reaction, e.g., a combustion flame. The premix chamber 107 may have a chamber width $W_C$ and a chamber length $W_L$. The premix chamber 107 may be operably coupled to deliver an oxidant-fuel mixture flow 112 to the perforated reaction holder 102 through an opening 109. The opening 109 can include the same shape, width, and length as the premix chamber 107, in one embodiment. In another embodiment, the opening 109 has a shorter width and/or length than the premix chamber 107. The opening 109 may also be formed with a different shape, e.g., a circle, oval, square, rectangle, than the premix chamber 107, according to another embodiment. The opening 109 can be configured to disperse or deliver the oxidant-fuel mixture flow 112 into a combustion volume 108 and, more particularly, into the perforated reaction holder 102.

The opening 109 can be configured to disperse or deliver the oxidant-fuel mixture flow 112 into the perforated reaction holder 102 through a flame arrestor 111. To reduce or eliminate risk of flashback, the flame arrestor 111 may be positioned between the opening 109 and the perforated reaction holder 102, within the combustion volume 108. The flame arrestor 111 may be separated from the perforated reaction holder 102 by a distance $D_1$ to reduce radiative heating of the flame arrestor 111 by the combustion reaction that occurs at the perforated reaction holder 102. The flame arrestor 111 may be carried by or may be disposed proximate to the premix chamber 107. The flame arrestor 111 may include one or more layers of porous objects, such as a wire mesh or perforated sheet metal, and may have a thickness or depth that suppresses the passage of a combustion reaction, e.g., combustion flame, into the opening 109. In one embodiment perforated flame holder 102 is spaced away from the flame arrestor 111 to minimize or reduce the view factor from the perforated flame holder 102 that is subtended by the flame arrestor 111, thereby minimizing or reducing thermal radiation impinging on the flame arrestor 111. The flame arrestor 111 includes an arrestor width $W_a$ and an arrestor length $L_a$. The arrestor width $W_a$ and an arrestor length $L_a$ may be the same as the chamber width $W_C$ and the chamber length $L_C$, according to one embodiment.

The perforated reaction holder 102 may include a perforated reaction holder body 114 and a plurality of perforations 116 within the perforated reaction holder body 114. The plurality of perforations 116 may be aligned to receive the oxidant-fuel mixture flow 112 from the opening 109 and the flame arrestor 111. The perforations 116 are configured to collectively hold a combustion reaction (e.g., see FIGS. 2A-2B, 208) supported by the oxidant-fuel mixture flow 112.

The fuel can include a hydrocarbon gas or a vaporized hydrocarbon liquid, for example. The fuel can be a single species or can include a mixture of gases and vapors. For example in a process heater application, the fuel can include fuel gas or byproducts from the process that include carbon monoxide (CO), hydrogen ($H_2$), and methane ($CH_4$). In another application the fuel can include natural gas (mostly $CH_4$) or propane. In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas.

Generally, the oxidation reaction held by the perforated reaction holder is indicative of a gas phase oxidation reaction. Other reactants and reactions may be substituted without departing from the spirit and scope of the disclosure.

According to an embodiment, the perforated reaction holder body 114 can be bounded by or can include an input surface 118 positioned within the combustion volume 108 to receive the oxidant-fuel mixture flow 112. The perforated reaction holder body 114 can also be bounded by or can include an output surface 120 facing away from the opening 109, and can include one or more peripheral surfaces 122 that defines a lateral extent of the perforated reaction holder 102. The plurality of perforations 116 defined by the perforated reaction holder body 114 extend from the input surface 118 to the output surface 120 and contain, carry, and/or enclose at least part of the oxidant-fuel mixture flow 112 and/or the combustion reaction 208 (shown in FIGS. 2A-2B).

According to an embodiment, the perforated reaction holder 102 is configured to hold a majority of the combustion reaction within the perforations 116. For example, more than half the molecules of oxidant-fuel mixture flow 112 in the combustion volume 108 can be converted into combustion products between the input surface 118 and the output surface 120 of the perforated reaction holder 102. According to an alternative interpretation, this means that more than half of the heat output by the combustion reaction is output between the input surface 118 and the output surface 120 of the perforated reaction holder 102. Under nominal operating conditions, the perforations 116 can be configured to collectively hold at least 80% of the combustion reaction 208 (shown in FIGS. 2A-2B) between the input surface 118 and the output surface 120 of the perforated reaction holder 102. In some experiments, the inventors produced a combustion reaction that was wholly contained in the perforations between the input surface 118 and the output surface 120 of the perforated reaction holder 102.

The perforated reaction holder 102 can be configured to receive heat from the combustion reaction and output a portion of the received heat as thermal radiation 124 to heat-receiving structures (e.g., furnace walls 106 and/or radiant section working fluid tubes (see. FIG. 7A, 710)) in or adjacent to the combustion volume 108.

The perforated reaction holder 102 can output a portion of the received heat to the oxidant-fuel mixture flow 112 received at the input surface 118 of the perforated reaction holder 102. In this way, the perforated reaction holder 102 can serve as a heat source to maintain the combustion reaction, even under conditions where a combustion reaction would not be stable when supported from a conventional flame holder. Advantageously, this capability can be leveraged to support combustion using a leaner fuel to oxidant mixture than was previously feasible, e.g., using traditional combustion systems. Leaner combustion results in lower peak combustion temperature and reduces oxides of nitrogen ("NOx") output. Moreover, the perforated reaction holder 102 may act as a heat sink to cool hotter parts of the reaction to further minimize combustion temperature. Finally, substantial containment of the combustion reaction between the input surface 118 and the output surface 120 of the perforated reaction holder 102 limits the time during which the combustion fluid (including molecular nitrogen, $N_2$, if the oxidant includes oxygen carried by air) is exposed to high temperature. Limiting the time during which the combustion fluid is exposed to high temperatures may further limit NOx output.

Flue gas is vented to the atmosphere through an exhaust flue 134. The flue gas is cooler than the temperature of the combustion reaction, but may be warmer than the temperature of the oxidant-fuel mixture flow 112. The vented flue gas can be optionally recirculated and/or injected into the oxidant-fuel mixture flow 112 to increase the efficiency of the combustion system 101. For example, a pipe 121 (or other gaseous transmission device) may be coupled between the exhaust flue 134 and the combustion volume 108, e.g., between the flame arrestor 111 and the perforated reaction holder 102. The flue gas may be injected into the oxidant-fuel mixture flow 112 with a pump 125 at an outlet 123 to preheat the oxidant-fuel mixture flow 112 and/or to dilute the oxidant-fuel mixture flow 112. Injecting or pumping injected flue gas into the oxidant-fuel mixture flow 112 may enable residual combustibles within the flue gas to be more fully burned through a second or subsequent pass through the combustion reaction, thereby increasing the use of the fuel and decreasing undesirable by-products in the flue gas.

The perforated reaction holder 102 can have a width dimension $W_{RH}$ between opposite sides of the peripheral surface 122 that is at least twice as long as a thickness dimension $T_{RH}$ between the input surface 118 and the output surface 120. In another embodiment, the perforated reaction holder 102 can have a width dimension $W_{RH}$ between opposite sides of the peripheral surface 122 that is at least three times a thickness dimension $T_{RH}$ between the input surface 118 and the output surface 120. In another embodiment, the perforated reaction holder 102 has a width dimension $W_{RH}$ between opposite sides of the peripheral surface 122 that is at least six times a thickness dimension $T_{RH}$ between the input surface 118 and the output surface 120. In another embodiment, the perforated reaction holder 102 has a width dimension $W_{RH}$ between opposite sides of the peripheral surface 122 that is at least nine times a thickness dimension $T_{RH}$ between the input surface 118 and the output surface 120.

In an embodiment, the perforated reaction holder 102 can have a width dimension $W_{RH}$ less than a width W of the combustion volume 108. This can allow circulation of flue gas from above to below the perforated reaction holder 102.

In an embodiment, the arrestor width $W_a$ of the flame arrestor 111 is the same as the width $W_{RH}$ of the perforated reaction holder 102. In an embodiment, the chamber width $W_C$ of the premix chamber 107 is the same as the width $W_{RH}$ of the perforated reaction holder 102.

The perforated reaction holder 102 can be formed from a refractory material. In another embodiment, the perforated reaction holder 102 can be formed from an aluminum silicate material. In another embodiment, the perforated reaction holder 102 can be formed from Mullite or cordierite.

In one embodiment, the fuel source 103 is partially diluted in the premix chamber 107 and further diluted in the combustion volume 108.

The perforated reaction holder 102 can include a single perforated reaction holder body 114. In another embodiment, the perforated reaction holder 102 can include a plurality of adjacent perforated reaction holder sections 102a, 102b, 102c, 102d. (e.g., see the tiled perforated reaction holder 102 shown in FIG. 7.) The plurality of adjacent perforated reaction holder bodies 114 can provide a tiled perforated reaction holder 102.

The perforated reaction holder 102 can further include a perforated reaction holder tile support structure 702 (see, e.g., FIG. 7) configured to support the plurality of perforated reaction holder sections 102a, 102b, 102c, 102d. The perforated reaction holder tile support structure 702 can include a metal superalloy. In another embodiment, the plurality of adjacent perforated reaction holder sections 102a, 102b, 102c, 102d can be joined with a fiber reinforced refractory cement.

The opening 109 can be configured to output varying fuel-to-oxidant ratios. The opening 109 can be configured to output pure fuel. The opening 109 can be configured to output a gas, liquid, or mist that includes more oxidant than fuel; more fuel than oxidant; or equal parts fuel and oxidant, according to an embodiment.

A control circuit 113 can be optionally used to control one or more valves that may be operably coupled between the premix chamber 107, the oxidant source 105, and the fuel source 103. A valve 117 may be operably coupled between the premix chamber 107 and the oxidant source 105 to selectively manage the amount of oxidant introduced into the premix chamber 107. A valve 119 may be operably coupled between the premix chamber 107 and the fuel source 103 to selectively manage the amount of fuel introduced into the premix chamber 107. In one embodiment, the valves 117 and 119 are manually actuated. In another embodiment, each of the valves 117 and 119 may include actuators that are controllably coupled or operably coupled to the control circuit 113. The control circuit 113 can then be configured to premix and deliver a predetermined ratio of oxidant-fuel mixture into the combustion volume 108. In one embodiment, the control circuit 113 is also coupled to the pump 125 to selectively control an amount of flue gas that is re-circulated into the combustion volume 108 to preheat and/or dilute the oxidant-fuel mixture flow 112.

Figure 1C:
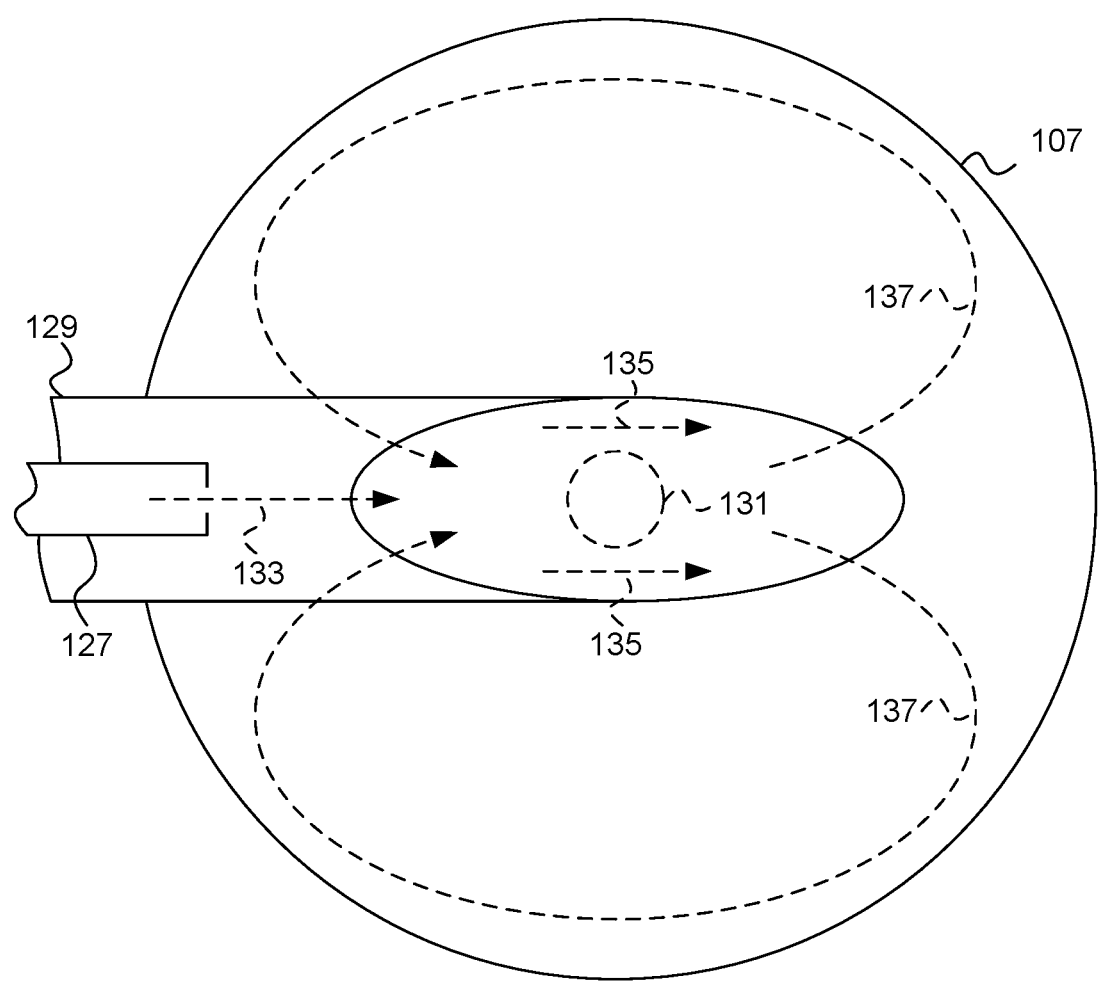
FIG. 1C is a simplified sectional view of a premix chamber of the burner system of FIG. 1A and/or FIG. 1B, according to an embodiment.

FIG. 1C is a bottom sectional diagram of the premix chamber 107 of FIGS. 1A and 1B, according to one embodiment. The premix chamber 107 can be configured to receive a fuel inlet 127 and an oxidant inlet 129 from a common side and through a common opening in the premix chamber 107. The premix chamber 107 also includes an outlet 131 through which the oxidant-fuel mixture is expressed, passed, or delivered, according to one embodiment. The outlet 131 is illustrated as a circular aperture, but in some implementations, the outlet 131 may be a square, rectangular, or another other shape. The fuel inlet 127 may inject a fuel stream 133 into the premix chamber 107, and the oxidant inlet 129 may inject an oxidant stream 135 into the premix chamber 107. The oxidant inlet 129 may be terminated at an angle that directs the incoming fuel stream 133 and the incoming oxidant stream 135 away from the outlet 131 and that causes the fuel stream 133 and the oxidant stream 135 to mix prior to passing through the outlet 131. The fuel and oxidant inlets may be aligned such that they mix in a pair of counter-rotating vortices 137 from the same side of the premix chamber 107. This may result in more rapid mixing than any other arrangement. This implementation of vortex mixing may reduce or eliminate any Taylor layers and/or any Batchelor layers in the oxidant-fuel mixture prior to delivering the oxidant-fuel mixture to the perforated reaction holder 102. Large NOx production can be avoided if care is taken to burn the oxidant-fuel mixture only after Taylor layers between pure reactants have disappeared and any vortex cores have been sufficiently diluted with air, such that there are no fluid elements at stoichiometric composition, resulting in a reduction of peak temperature of the fluid elements of the combustion reaction.

Unlike a diffusion flame, a perforated reaction holder burner architecture, e.g., the burner system 100 and/or the combustion system 101, delays combustion until sufficient entrainment of air and flue gas insures low combustion reaction temperatures and low NOx emissions. During operation, combustion occurs in the perforated reaction holder burner architecture far downstream from the fuel nozzle, so that injected fuel has mixed with sufficient air to be lean of stoichiometric. Premixing the oxidant-fuel mixture may be used to reduce or eliminate the Taylor layer between pure fuel and air. Consequently, the temperature of the combustion products can be maintained relatively low. The radiation of heat from the output surface 120 of the perforated reaction holder 102 further lowers the temperature, resulting in lower NOx levels.

Fully premixed burners in a confined duct can pose safety risks. However, the flame arrestor 111 can be sized and positioned to reduce or eliminate the risks associated with flashback into the premix chamber 107.

Figure 2A:
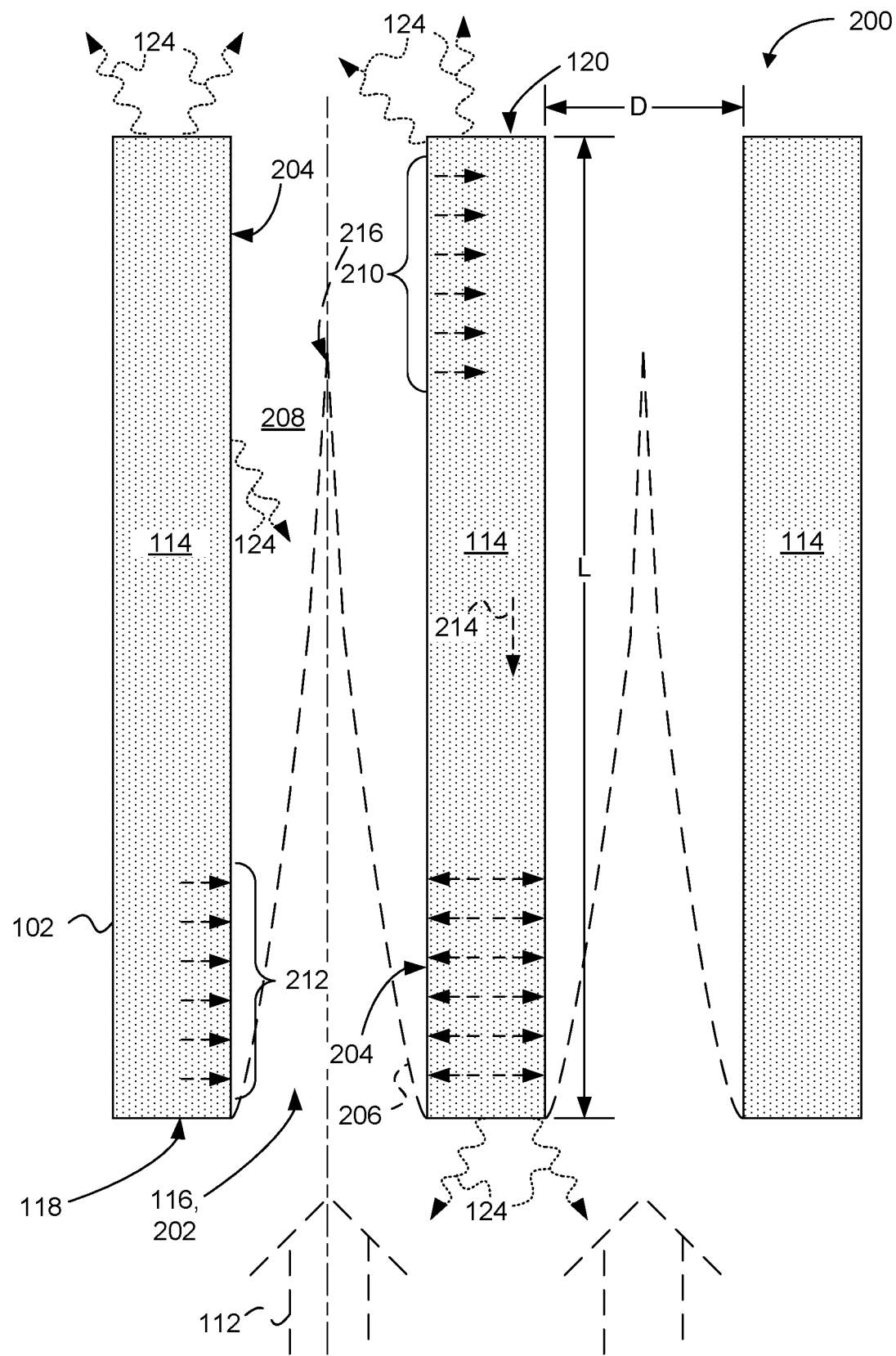
FIG. 2A is side sectional diagram of a portion of the perforated reaction holder of FIGS. 1A and 1B, according to an embodiment.

FIG. 2A is side sectional diagram of a portion of a perforated reaction holder 200 that corresponds with one implementation of the perforated reaction holder 102 of FIGS. 1A and 1B, according to an embodiment. In one embodiment of the perforated reaction holder 200 of FIG. 2A, the perforated reaction holder body 114 is continuous. That is, the body 114 is formed from a single piece of material. The perforated reaction holder 200 of FIG. 2A also illustrates perforations 116 that are non-branching. That is, the perforated reaction holder body 114 defines perforations 116 that are separated from one another such that no flow crosses between perforations.

Figure 2B:
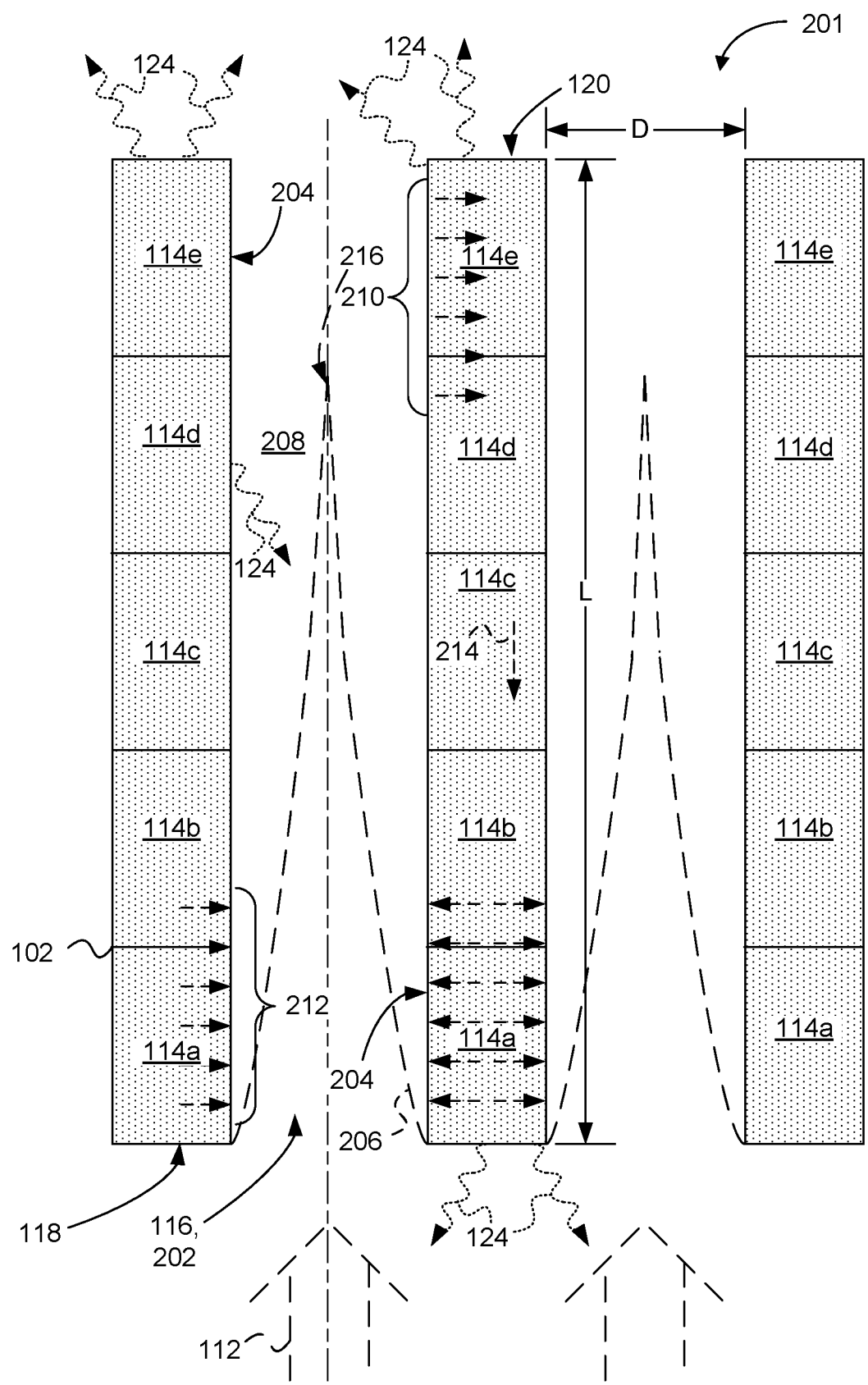
FIG. 2B is a side sectional diagram of the perforated reaction holder of FIGS. 1A and 1B, according to another embodiment.

FIG. 2B illustrates a perforated reaction holder 201 that corresponds with one implementation of the perforated reaction holder 102 of FIGS. 1A and 1B. In the perforated reaction holder 201, the perforated reaction holder body 114 is discontinuous. For example, the perforated reaction holder body 114 is formed from a plurality of pieces 114a, 114b, 114c, 114d, 114e that together form the perforated reaction holder body 114. Although the perforated reaction holder body 114a, 114b, 114c, 114d, 114e is discontinuous, it also defines perforations 116 that are non-branching in that they are separated from one another by the perforated reaction holder body 114. The perforated reaction holder body 114 of FIG. 2B can include stacked sheets of material, with each sheet having openings registered to the openings of at least one of a subjacent or superjacent sheet.

A continuous perforated reaction holder body 114 refers to a single body that has perforations formed through the body 114, in contrast to a perforated reaction holder body 114 formed from a plurality of individual pieces. This is a different than the concept of singular or plural perforated reaction holder sections (see FIG. 7, 102a, 102b, 102c, 102d). The sections 102a, 102b, 102c, 102d can be formed from either continuous or discontinuous perforated reaction holder bodies 114.

Figure 2C:
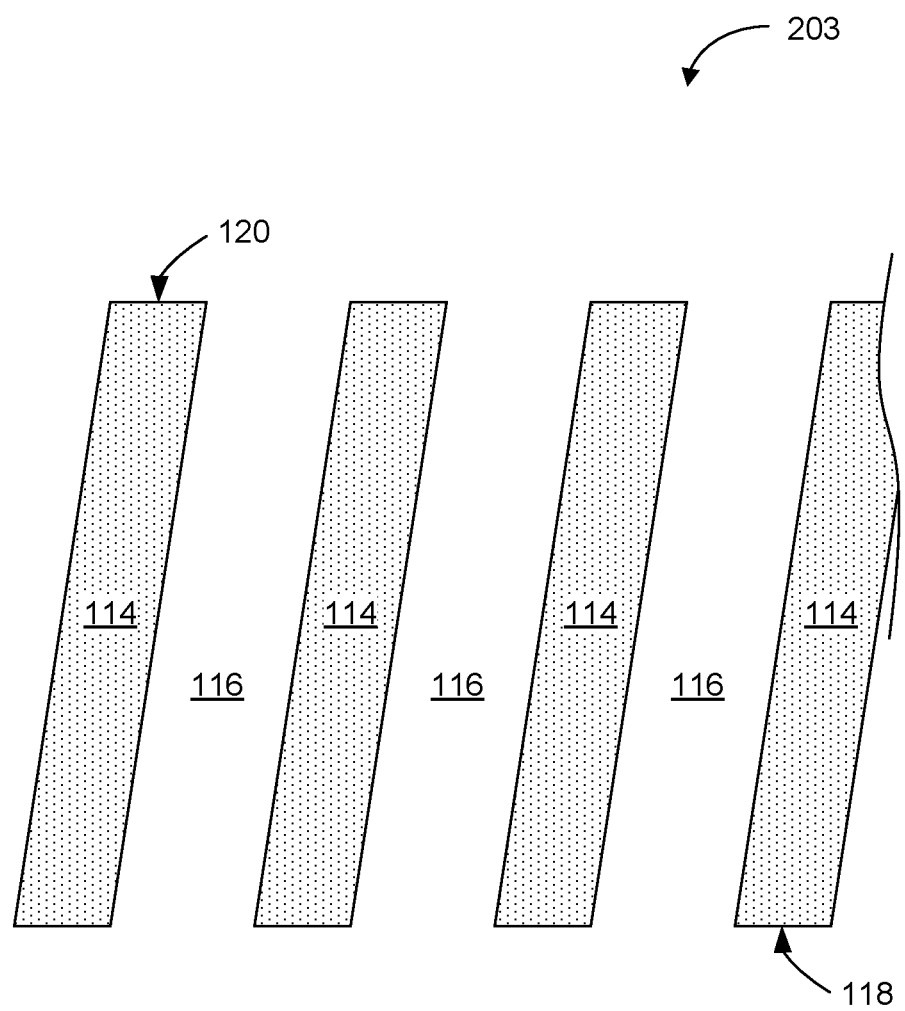
FIG. 2C is a side sectional diagram of the perforated reaction holder of FIGS. 1A and 1B, according to another embodiment.

FIG. 2C is a side sectional view of a perforated reaction holder 203 that corresponds with an implementation of the perforated reaction holder 102, according to one embodiment. In the perforated reaction holder 203, the perforated reaction holder body 114 defines perforations that are non-normal to the input and output surfaces 118, 120. While this arrangement has an effect on gas trajectory exiting the output surface 120, the perforations can operate similarly to those described in conjunction with FIGS. 2A and 2B.

Referring now to FIGS. 2A and 2B, the perforated reaction holder body 114 defines a plurality of perforations 116 configured to convey the fuel and oxidant and to hold the combustion reaction 208 supported by the fuel and oxidant. The body is configured to receive heat from the combustion reaction 208, hold the heat, and output the heat to the fuel and oxidant entering the perforations 116. The perforations 116 can maintain a combustion reaction 208 of a leaner mixture of the oxidant-fuel mixture flow 112 than is maintained outside of the perforations 116 because the perforated reaction holder body 114 heats the oxidant-fuel mixture flow 112 with greater thermal radiation 124 while the oxidant-fuel mixture flow 112 is within the perforations 116.

The perforated reaction holder 102 has an extent defined by an input surface 118 facing the opening 109 (see FIGS. 1A and 1B) and an output surface 120 facing away from the opening 109. The perforated reaction holder body 114 defines a plurality of perforations 116 that can be formed as a plurality of elongated apertures 202 extending from the input surface 118 to the output surface 120.

The perforated reaction holder 102 receives heat from the combustion reaction 208 and outputs sufficient heat to the oxidant-fuel mixture flow 112 to maintain the combustion reaction 208 in the perforations 116. The perforated reaction holder 102 can also output a portion of the received heat as thermal radiation 124 to combustor or furnace walls 106 (see FIG. 1B) of the combustion volume 108 (see FIGS. 1A and 1B). Each of the perforations 116 can bound a respective finite portion of the fuel combustion reaction 208.

In an embodiment, the plurality of perforations 116 are each characterized by a length L defined as a reaction fluid propagation path length between the input surface 118 and the output surface 120 of the perforated reaction holder 102. The reaction fluid includes the oxidant-fuel mixture flow 112 (optionally including air, flue gas, and/or other "non-reactive" species, reaction intermediates (including transition states that characterize the combustion reaction), and reaction products).

The plurality of perforations 116 can each be characterized by a transverse dimension D between opposing perforation walls 204. The length L of each perforation 116 can be at least eight times the transverse dimension D of the perforation. In another embodiment, the length L can be at least twelve times the transverse dimension D. In another embodiment, the length L can be at least sixteen times the transverse dimension D. In another embodiment, the length L can be at least twenty-four times the transverse dimension D. The length L can be sufficiently long for thermal boundary layers 206 formed adjacent to the perforation walls 204 in a reaction fluid flowing through the perforations 116 to converge within the perforations 116, for example.

According to an embodiment, the perforated reaction holder 102 can be configured to cause the fuel combustion reaction 208 to occur within thermal boundary layers 206 formed adjacent to perforation walls 204 of the perforations 116. As relatively cool oxidant-fuel mixture flow 112 approaches the input surface 118, the flow is split into portions that respectively travel through individual perforations 116. The hot perforated reaction holder body 114 transfers heat to the fluid, notably within thermal boundary layer 206 that progressively thicken as more and more heat is transferred to the incoming fuel and oxidant. After reaching a combustion temperature, the reactants flow while a chemical ignition delay time elapses, after which the combustion reaction occurs. Accordingly, the combustion reaction 208 is shown as occurring within the thermal boundary layers 206. As flow progresses, the thermal boundary layers merge at a point 216. Ideally, the point 216 lies between the input surface 118 and output surface 120. At some point, the combustion reaction 208 causes the flowing gas (and plasma) to output more heat than it receives from the body 114. The received heat (from a region 210) is carried to a region nearer to the input surface 118, where the heat recycles into the cool reactants.

The perforations 116 can include elongated squares, each of the elongated squares has a transverse dimension D between opposing sides of the squares. In another embodiment, the perforations 116 can include elongated hexagons, each of the elongated hexagons has a transverse dimension D between opposing sides of the hexagons. In another embodiment, the perforations 116 can include hollow cylinders, each of the hollow cylinders has a transverse dimension D corresponding to a diameter of the cylinders. In another embodiment, the perforations 116 can include truncated cones, each of the truncated cones has a transverse dimension D that is rotationally symmetrical about a length axis that extends from the input surface 118 to the output surface 120. The perforations 116 can each have a lateral dimension D equal to or greater than a quenching distance of the fuel.

In one range of embodiments, the plurality of perforations 116 have a lateral dimension D between 0.05 inch and 1.0 inch. Preferably, the plurality of perforations 116 have a lateral dimension D between 0.1 inch and 0.5 inch. For example the plurality of perforations can have a lateral dimension D of about 0.2 to 0.4 inch.

The perforated reaction holder body 114 can include a refractory material. The perforated reaction holder body 114 can include a metal superalloy, for example, or the perforated reaction holder body can be formed from a refractory material such as cordierite or Mullite, for example. The perforated reaction holder body 114 can define a honeycomb.

The perforations 116 can be parallel to one another and normal to the input and output surfaces 118, 120. In another embodiment, the perforations 116 can be parallel to one another and formed at an angle relative to the input and output surfaces 118, 120. In another embodiment, the perforations 116 can be non-parallel to one another. In another embodiment, the perforations 116 can be non-parallel to one another and non-intersecting.

Referring to FIG. 2C, the perforations 116 can be formed at an angle relative to an input surface and an output surface 118, 120 of the perforated reaction holder 102. In another embodiment, the perforations 116 can be respectively formed at an angle relative to the input and output surfaces 118, 120 of the perforated reaction holder 102 and can be collectively angled to produce a streamwise vortex in oxidation fluid exiting from the perforated reaction holder 102.

Referring again to FIGS. 2A and 2B, the perforated reaction holder body 114 defining the perforations 116 can be configured to receive heat from the (exothermic) combustion reaction 208 at least in second regions 210 of perforation walls 204. (e.g., near the output surface 120 of the perforated reaction holder 102). The perforated reaction holder body 114 defining the perforations 116 can be characterized by a heat capacity. The perforated reaction holder body 114 can be configured to hold heat from the combustion fuel reaction in an amount corresponding to the heat capacity.

The perforated reaction holder body 114 can be configured to transfer heat from the heat receiving regions 210 to heat output regions 212 of the perforation walls 204. (e.g., where the heat output regions 212 are near the input surface 118 of the perforated reaction holder 102). For example, the perforated reaction holder body 114 can be configured to transfer heat from the heat receiving regions 210 to the heat-output regions 212 of the perforation walls 204 via thermal radiation 124. Additionally or alternatively, the body 114 can be configured to transfer heat from the heat-receiving regions 210 to the heat-output regions 212 of the perforation walls 204 via a heat conduction path 214.

In another embodiment, the perforated reaction holder body 114 can be configured to transfer heat to a working fluid. The working fluid can be configured to transfer heat from a portion of the body near the heat-receiving regions 210 of the perforation walls 204 to a portion of the body near the heat-output regions 212 of the perforation walls 204. The perforated reaction holder body 114 can be configured to output heat to the boundary layers 206 at least in heat-output regions 212 of perforation walls 204 (e.g., near the input surface 118 of the perforated reaction holder 102). Additionally or alternatively, the body 114 can be configured to output heat to the oxidant-fuel mixture flow 112 at least in heat-output regions 212 of perforation walls 204 (e.g., near the input surface 118 of the perforated reaction holder 102). The perforated reaction holder body 114 may be configured to convey heat between adjacent perforations 116. The heat conveyed between adjacent perforations can be selected to cause heat output from the combustion reaction portion 208 in a perforation 116 to supply heat to stabilize a combustion reaction portion 208 in an adjacent perforation 116.

The perforated reaction holder body 114 can be configured to receive heat from the fuel combustion reaction 208 and output thermal radiation 124 (or thermal energy) to maintain a temperature of the perforated reaction holder body 114 below an adiabatic flame temperature of the fuel combustion reaction 208. Additionally or alternatively, the body can be configured to receive heat from the fuel combustion reaction 208 to cool the fuel combustion reaction 208 to a temperature below a NOx formation temperature, e.g., by coupling the perforated reaction holder body 114 to a heat sink or by transferring a working fluid through the perforated reaction holder body 114 to function as a heat sink.

The plurality of perforations 116 can include a plurality of elongated squares. In another embodiment, the plurality of perforations 116 can include a plurality of elongated hexagons.

Honeycomb shapes used in the perforated reaction holder 102 can be formed from VERSAGRID® ceramic honeycomb, available from Applied Ceramics, Inc. of Doraville, S.C.

As described above, FIG. 2A illustrates a perforated reaction holder 200 that can include a perforated reaction holder body 114 that is continuous. A continuous reaction holder body 114 is, within any one section, a single piece that is extruded, drilled, or otherwise formed to define the plurality of perforations 116, according to one embodiment. FIG. 2B illustrates the perforated reaction holder 201 that includes a perforated reaction holder body 114 that is discontinuous. A discontinuous reaction holder body 114 is formed from a plurality of pieces of material, according to one embodiment. In the perforated reaction holder 201, the plurality of pieces of material comprise planar pieces 114a, 114b, 114c, 114d that are stacked to form the reaction holder body 114, according to one embodiment. The perforated reaction holders 200 and 201 operate substantially identical to one another, in that the individual stacked pieces 114a, 114b, 114c, 114d are intimately contacting and form perforations 116 that are separated from one another, in one embodiment.

Figure 3:
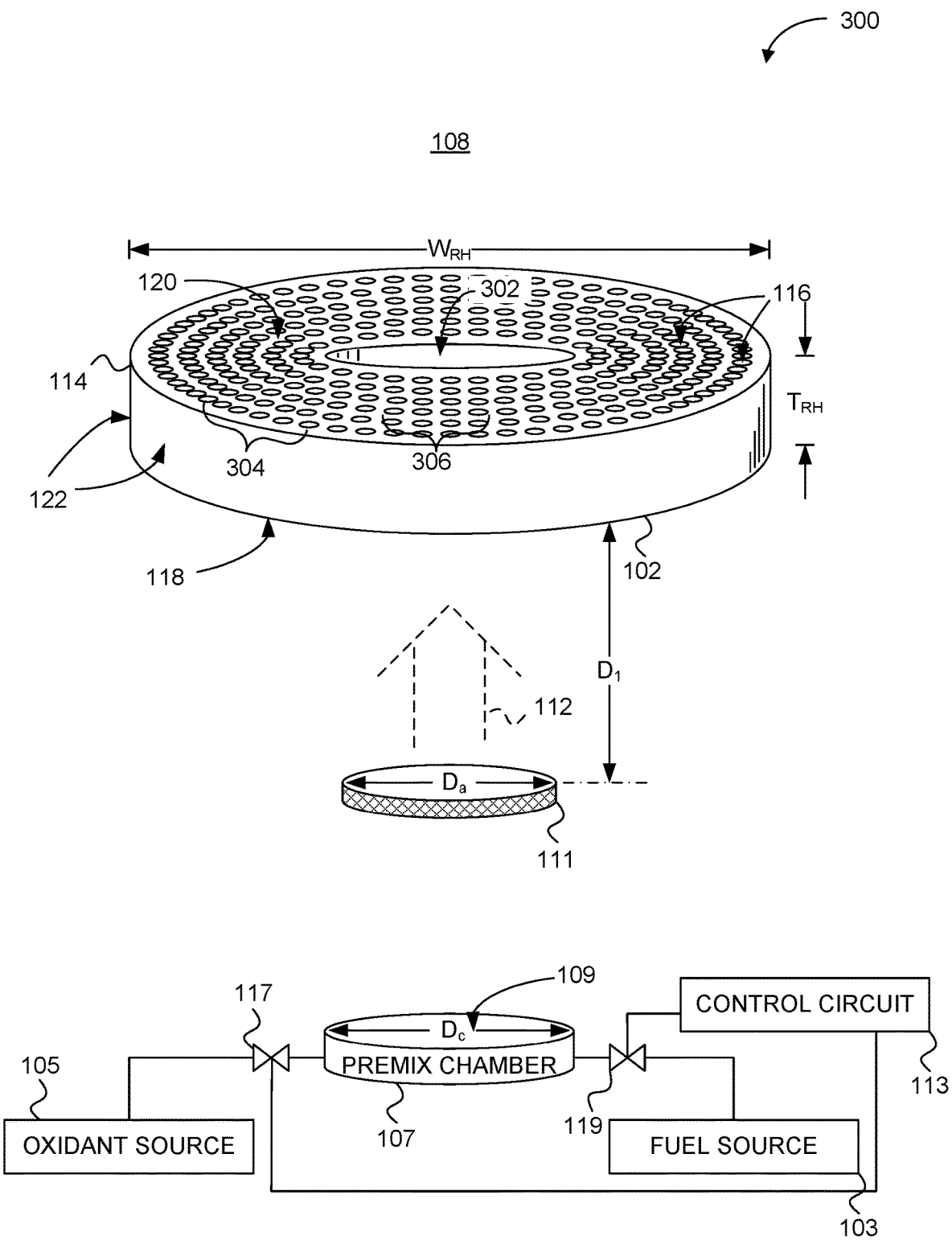
FIG. 3 is a simplified perspective view of the burner system of FIGS. 1A and 1B, including an alternative perforated reaction holder, according to an embodiment.

FIG. 3 is a simplified perspective view 300 of the combustion system of FIGS. 1A and 1B including an alternative perforated reaction holder 102 and an alternative premix chamber 107, according to an embodiment. Referring to FIG. 3, the plurality of perforations 116 can include a plurality of hollow cylinders. The reaction holder body 114 can include a fiber reinforced cast refractory material. The plurality of perforations 116 can be formed by drilling through the fiber reinforced cast refractory material. (Perforations may also be referred to as "apertures" or "elongated apertures", which can be considered synonymous.) A void fraction of the perforated reaction holder 102 can be about 0.30.

The perforated reaction holder body 114 can define a central aperture 302, a first set of apertures 304 in a concentric arrangement relative to the central aperture 302 having a selected spacing and size, and a second set of apertures 306 in concentric arrangement relative to the central aperture 302 having a different selected spacing and size. The perforated reaction holder 102 can be configured to hold the fuel combustion reaction (e.g., see FIG. 2, 208) between the input surface 118 and output surface 120 of the perforated reaction holder 102.

Operation of the perforated reaction holder 102 embodiment 300 of FIG. 3 can be visualized with reference to the side sectional view of FIG. 2A. In an embodiment 300 tested by the inventors, a plurality of fuel nozzles (six active nozzles with one central natural draft air source) were distributed in a circle below and about midway between the peripheral surface 122 and the edge of the central aperture 302. The presence of the central aperture 302 was believed to be irrelevant during the tests. While the inventors hypothesized that different sizing and spacing of the concentric arrangements of sets of apertures 304, 306 would provide some value, it was found that the sizes and spacing of the apertures 304, 306 had less effect than other parameters. In particular, in one embodiment, changing to a higher void fraction of about 0.70 produced lower NOx.

The perforated reaction holder 102 can have a void fraction between 0.10 and 0.90. In an embodiment, the perforated reaction holder 102 can have a void fraction between 0.30 and 0.70. In another embodiment, the perforated reaction holder can have a void fraction of about 0.70.

The void fraction of a perforated reaction holder 102 is defined as the total volume of all perforations 116 (minus the total volume of any perforations that are not functional as perforations), divided by a total volume bounded by the input surface 118, the output surface 120, and the peripheral surface 122, minus any portion of the total bounded volume that is not functional as a perforated reaction holder 102. Some perforated reaction holder 102 embodiments can operate with less than 0.10 void fraction or more than 0.90 void fraction, but the inventors believe that a perforated reaction holder 102 having a void fraction between these limits is preferable. At a low void fraction, a perforated reaction holder 102 may exhibit undesirable pressure drop between the fuel and oxidant mixture (optionally including inert or carrier gas and flue gas) adjacent to the input surface 118 and the reaction fluid (e.g., reaction products, possible reaction intermediates, possible plasma, possible unreacted fuel, unreacted oxidant, and optional inert or carrier gas) adjacent to the output surface 120. The inventors reduced to practice perforated reaction holders respectively having about 0.70 and 0.30 void fractions. Between the two tested void fractions, the 0.70 void fraction perforated reaction holder 102, illustrated in FIG. 1A, produced lower NOx concentration than did the 0.30 void fraction perforated reaction holder 102 (illustrated in FIG. 3, below). At high void fractions (e.g. over about 0.90), the inventors contemplate a situation where the perforated reaction holder 102 could suffer from insufficient perforation surface area or insufficient perforated reaction holder body 114 heat capacity.

In one embodiment, the NOx concentration may be reduced by premixing the fuel source 103 with the oxidant source 105 in the premix chamber 107 prior to delivering the oxidant-fuel mixture flow 112 to the perforated reaction holder 102. In one embodiment, the premix chamber 107 is circular and includes a diameter $D_C$. In one embodiment, the opening 109 on the premix chamber 107 is also circular and has the same diameter as the premix chamber 107. In one embodiment, diameter $D_C$ of the premix chamber 107 and/or the diameter $D_a$ of the flame arrestor 111 may be the same as the width $W_{RH}$ of the perforated reaction holder 102. In one embodiment, the flame arrestor 111 may include the same shape as the premix chamber 107 and/or the opening 109 and may have a diameter $D_a$ that is the same length as the width $W_{RH}$ of the perforated reaction holder 102.

Figure 4A:
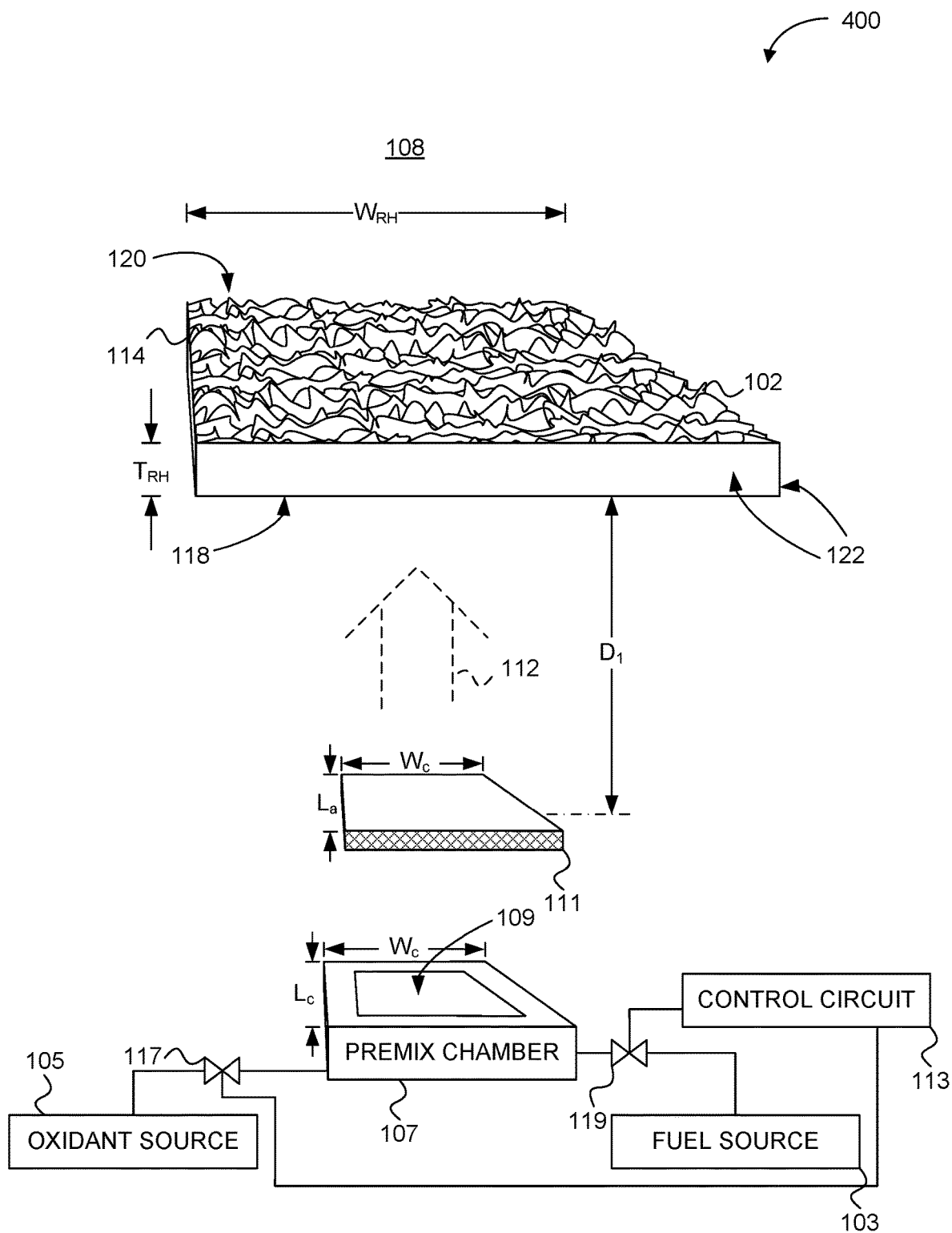
FIG. 4A is a simplified perspective view of the burner system of FIGS. 1A and 1B including another alternative perforated reaction holder, according to an embodiment.
Figure 4B:
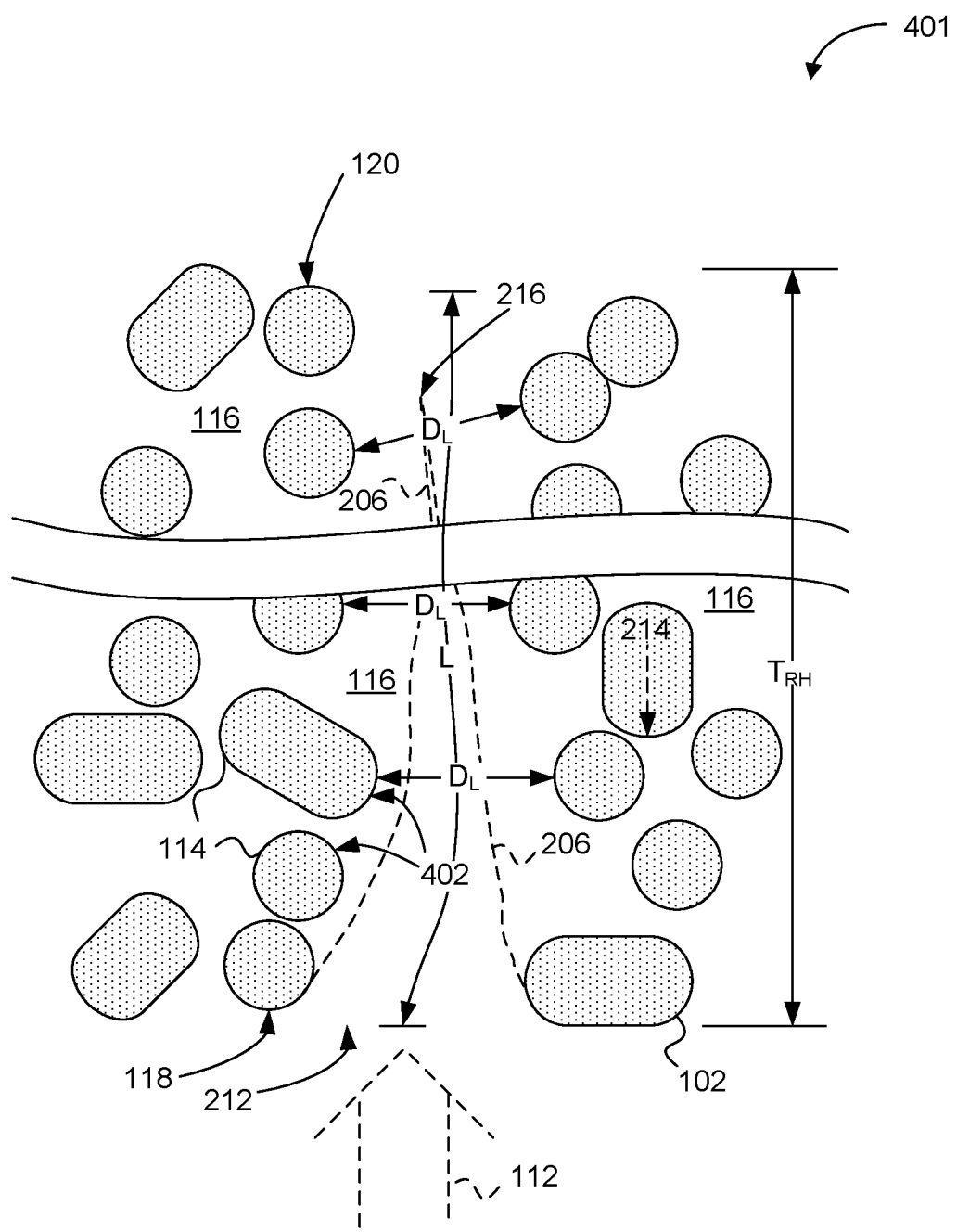
FIG. 4B is a simplified side sectional diagram of a portion of the perforated reaction holder of FIG. 4A, according to an embodiment.

FIG. 4A is a simplified perspective view 400 of the combustion system of FIGS. 1A and 1B including another alternative perforated reaction holder 102 including a discontinuous perforated reaction holder body 114 with branching perforations, according to an embodiment. FIG. 4B is a simplified side sectional diagram 401 of a portion of the perforated reaction holder 102 of FIG. 4A, according to an embodiment.

Referring to FIGS. 4A and 4B, the perforated reaction holder body 114 can be discontinuous. The perforated reaction holder body 114 can define perforations 116 that branch from one another. The perforated reaction holder body 114 can include stacked sheets of material, each sheet having openings non-registered to the openings of a subjacent or superjacent sheet. "Non-registered" openings (described below) refer to openings that cause branching of oxidation fluid flow paths. "Non-registered" openings may, in fact, correspond to patterns that have preplanned differences in location from one another. "Registered" openings, which cause the perforations 116 to be separated from one another, may also have preplanned differences in location from one sheet to another (or may be superpositioned to one another) but "registered" openings do not cause branching, and hence the perforations 116 are separated from one another. In one embodiment, the NOx concentration is reduced by premixing the fuel source 103 with the oxidant source 105 in the premix chamber 107 prior to delivering the oxidant-fuel mixture flow 112 to the perforated reaction holder 102.

Figure 4C:
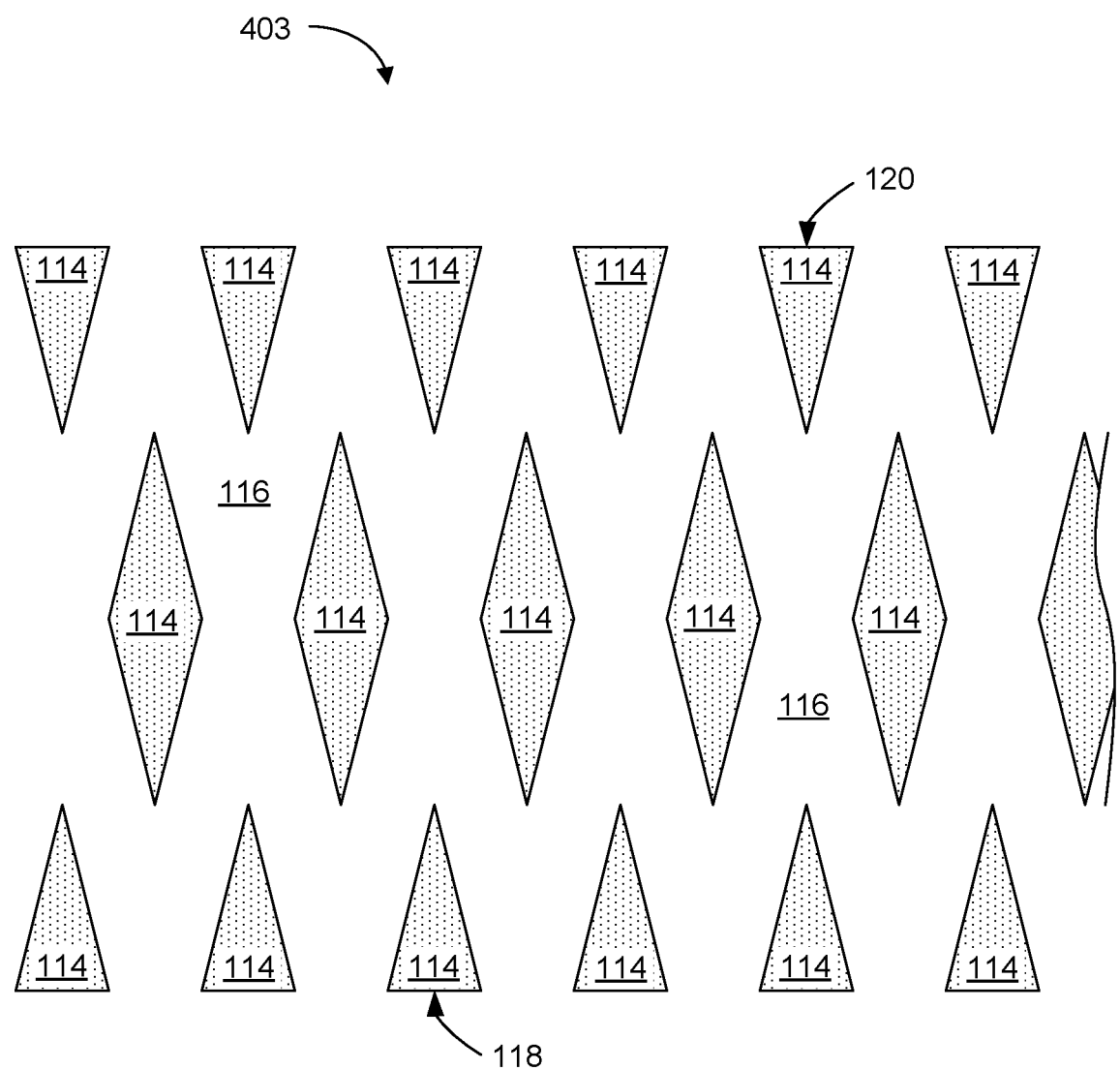
FIG. 4C is a simplified side sectional diagram of a portion of a perforated reaction holder, according to another embodiment.

FIG. 4C is a side sectional view of a perforated reaction holder 102 that has a continuous body 114 and branching perforations 116. The structure 403 of FIG. 4C may, for example, be formed by cross-drilling a solid piece of body 114 material.

Referring again to FIGS. 4A and 4B, the perforated reaction holder body 114 can include fibers 402 including reticulated fibers. The fibers 402 can define branching perforations 116 that weave around and through the fibers 402.

The fibers 402 can include an alumina silicate. For example, the fibers 402 can be formed from extruded Mullite or cordierite. In another embodiment, the fibers 402 can include a metal. For example, the fibers 402 can include stainless steel and/or a metal superalloy.

The term "reticulated fibers" refers to a netlike structure. In one embodiment, the fibers 402 are formed from an extruded ceramic material. In reticulated fiber embodiments, the interaction between the fuel and oxidant, the combustion reaction, and heat transfer to and from the perforated reaction holder body 114 functions similarly to the perforated reaction holder 200 shown and described above with respect to FIG. 2A. One difference in activity is a mixing between perforations 116, because the fibers 402 form a discontinuous perforated reaction holder body 114 that allows flow back and forth between neighboring perforations.

According to an embodiment, the reticulated fiber network 402 is sufficiently open for downstream fibers to emit radiation for receipt by upstream fibers for the purpose of heating the upstream fibers sufficiently to maintain combustion of a lean fuel and oxidant mixture. Compared to a continuous perforated reaction holder body 114, heat conduction paths 214 between fibers 402 are reduced owing to separation of the fibers. This may cause relatively more heat to be transferred from the heat-receiving region 210 (heat receiving area) to the heat-output region 212 (heat output area) of the perforation wall 204 via thermal radiation 124.

FIG. 4C is a simplified side sectional diagram 403 of a portion of a perforated reaction holder 102 including a continuous perforated reaction holder body with branching perforations, according to an embodiment. The perforated reaction holder embodiment 403 can be made by cross-drilling a continuous reaction holder body 114. The diamond and triangle shaped reaction holder 114 portions are joined by body structure out-of-plane with respect to the sectional view. In order to maintain a desired void fraction (e.g. about 0.70) the relative sizes of the perforations 116 (e.g., drilled holes) and the wall sections there-between are adjusted to make the walls relatively thicker compared to the wall thickness shown in FIGS. 1A and 2A. Referring to FIG. 4C, the perforated reaction holder body 114 can be continuous. The perforated reaction holder body 114 can define perforations 116 that branch from one another.

Referring to FIGS. 4A, 4B, and 4C, the formation of boundary layers 206, transfer of heat between the perforated reaction holder body 114 and the gases flowing through the perforations 116, characteristic dimension D, and length L can be regarded as related to an average or overall path through the perforated reaction holder 102. In other words, the dimension D can be determined as a root-mean-square of individual $D_n$ values determined at each point along a flow path. Similarly, the length L can be a length that includes length contributed by tortuosity of the flow path, which may be somewhat longer than a straight line distance $T_{RH}$ from the input surface 118 to the output surface 120 through the perforated reaction holder 102. According to an embodiment, the void fraction (expressed as (total perforated reaction holder 102 volume—fiber 402 volume)/total volume)) is about 70%.

Figure 5:
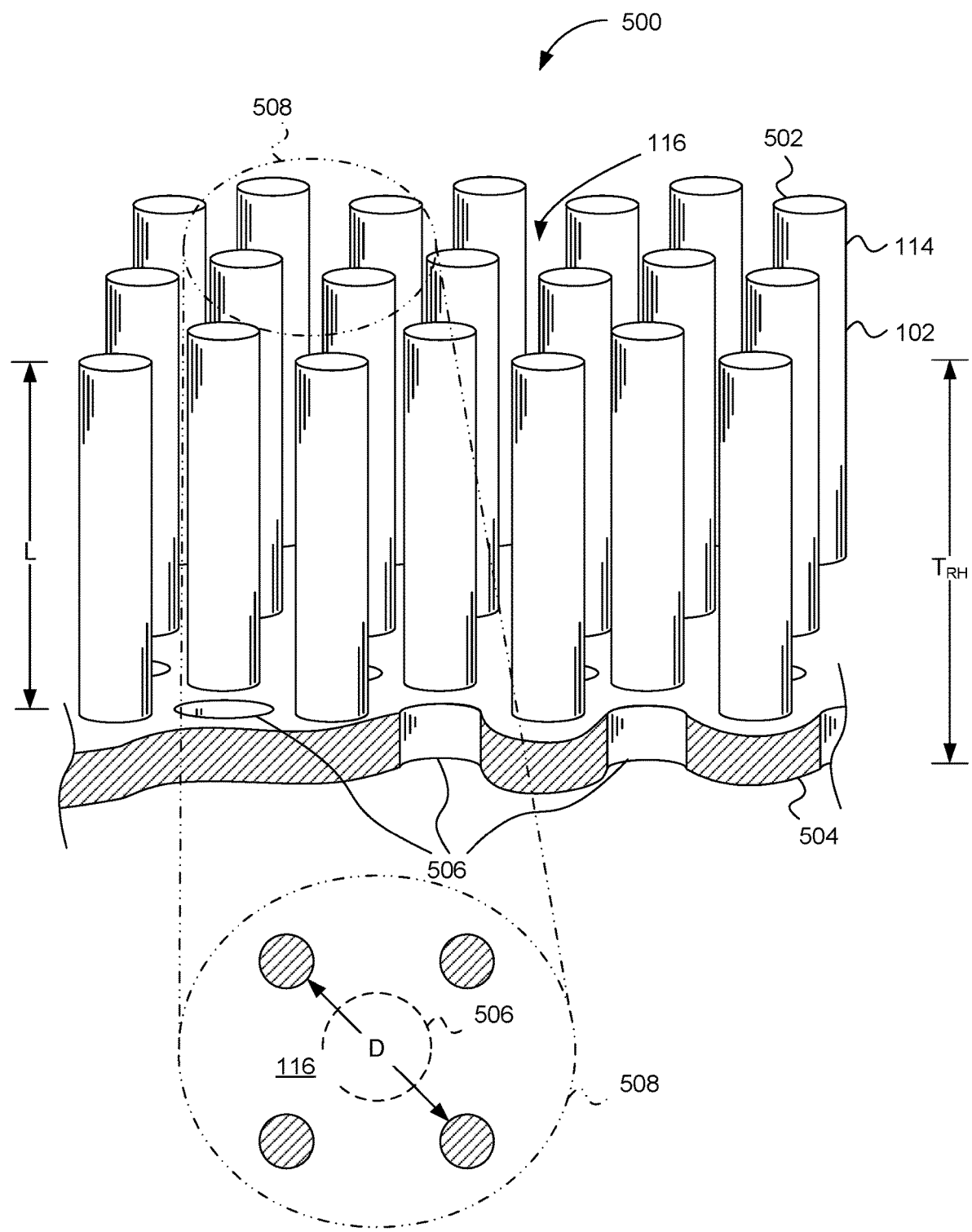
FIG. 5 is a simplified perspective view of an alternative perforated reaction holder including a pillar structure, according to an embodiment.

Referring to FIG. 5, in an alternative form 500 of the perforated reaction holder 102, the perforated reaction holder body 114 can include a plurality of pillars 502, according to an embodiment. The plurality of perforations 116 can include spaces between the plurality of pillars 502. A base plate 504 can be included and operatively coupled to the plurality of pillars 502. The base plate 504 can define a plurality of apertures 506 configured to allow combustion fluid to flow into the perforations 116 between the pillars 502. The base plate 504 can include a perforated metal sheet including openings selected to allow combustion fluid to flow into the perforations 116 between the pillars 502. Viewpoint 508 provides a top-down perspective view of the pillars 502 and the perforations 116 and illustrates that the pillars 502 may be separated by a distance D, according to one embodiment.

Figure 6:
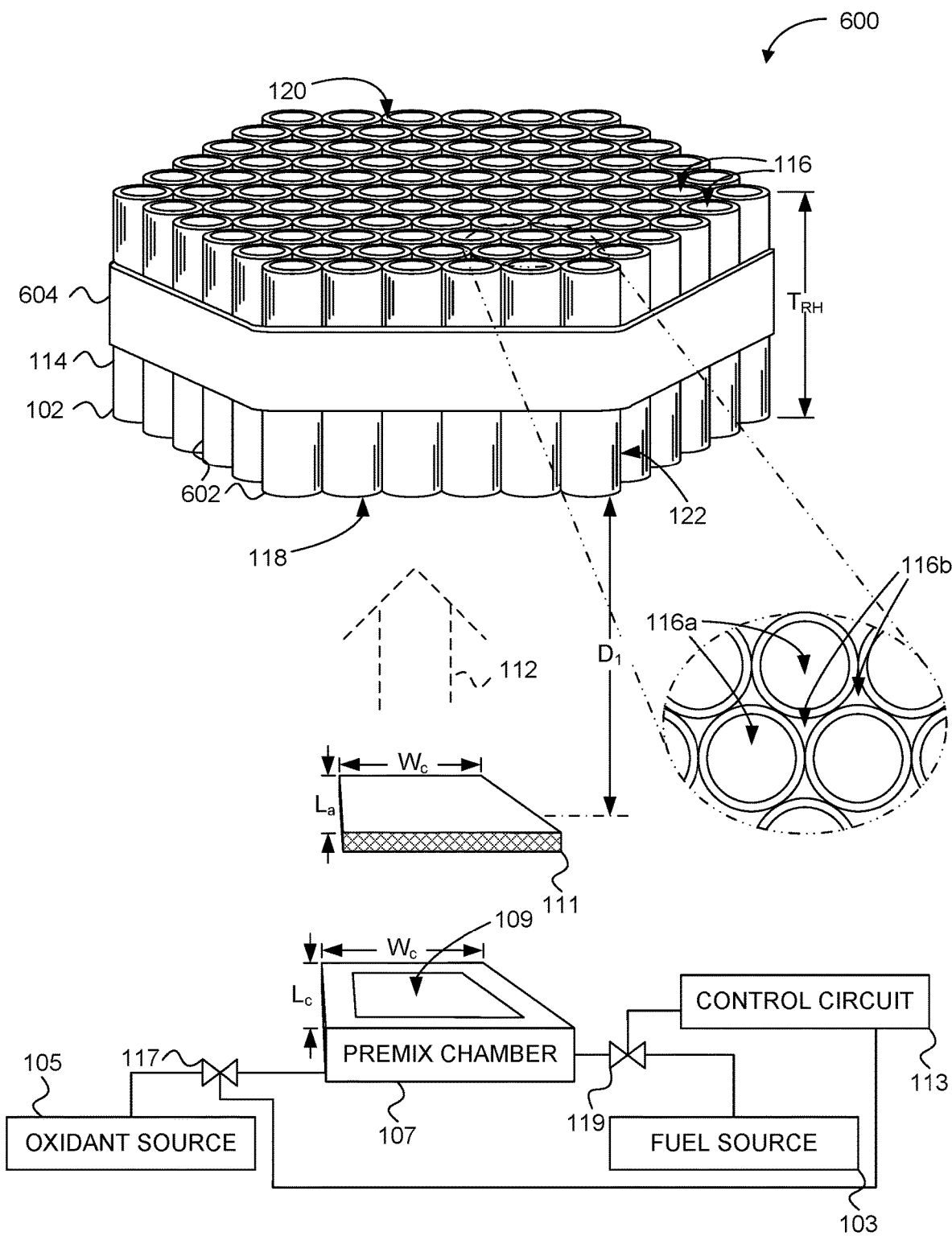
FIG. 6 is a simplified perspective view of an alternative perforated reaction holder including a tube bundle structure, according to an embodiment.

Referring to FIG. 6, the perforated reaction holder body 114 can include a plurality of tubes 602 bundled together, according to an embodiment. The plurality of perforations 116 can include hollow cylinders 116a inside the plurality of tubes 602. The plurality of perforations 116 can also include interstitial spaces 116b between the bundled tubes 602. The plurality of tubes 602 can include ceramic tubes and a metal tension member 604 circumferential to the plurality of tubes 602 arranged to hold the plurality of tubes 602 together. The metal tension member 604 can include stainless steel, a superalloy metal wire, and/or a superalloy metal band.

In an embodiment, the plurality of tubes 602 can include ceramic tubes. Refractory cement can be included between the tubes 602 and configured to adhere the tubes together. Alternatively, the plurality of tubes 602 can include metal tubes.

In addition to embodiments described above, the inventors contemplate a range of alternative physical structures of perforated reaction holders configured to function and produce effects similar to alternatives described above.

The perforated reaction holder body 114 can include stacked sheets of material, each sheet having openings non-registered to the openings of a subjacent or superjacent sheet, to form branching perforations 116.

The perforated reaction holder body 114 can be discontinuous and can define perforations 116 that branch from one another. The perforated reaction holder body 114 can include stacked sheets of material, each sheet having openings non-registered to the openings of a subjacent or superjacent sheet. The perforated reaction holder body 114 can include a plurality of perforated sheets stacked together to form a plurality of flow paths comprising the perforations 116. The perforated sheets can include perforated metal sheets, ceramic sheets and/or expanded sheets.

In another embodiment, the perforated reaction holder body 114 comprises discontinuous packing bodies and the perforations 116 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic Raschig ring, ceramic Berl saddles, ceramic Intalox saddles, and/or metal rings (e.g. Super Raschig Rings). The perforated reaction holder 102 can further include a metal cage configured to hold the ceramic balls.

A number of aspects distinguish the perforated reaction holder 102 over earlier burner apparatuses. In one aspect, the combustion front can freely move upstream and downstream responsive to a decrease or increase in flow velocity, respectively. This is because the thermal boundary layer thickness 206 (see FIGS. 2A, 2B and 4B) at any given location varies with fuel and air velocity such that the merger point 216 (see FIGS. 2A, 2B and 4B), and hence complete combustion location varies naturally responsive to changes in conditions. In this respect, the perforated flame holder will not prevent propagation of a flame upstream across a range of operating temperatures.

On simplified way of looking at this is to compare the dimension D to a fuel characteristic known as "quenching distance." It should be noted that perforated flame holders that have lateral dimensions less than published quenching distances have been successfully tested by the inventors. On the other hand, earlier apparatuses (that operate using different principles) typically require that any porosity in the flame holder be limited to sizes less than quenching distance in order to avoid potentially explosive travel of the combustion reaction into a fuel and air mixture volume that can undergo conflagration or detonation. The inventors have found that, in embodiments described herein, lateral dimensions D greater than the flame quenching distance can be useful for allowing longer thickness L (having greater mechanical stability) and also for reducing flow back pressure.

In some embodiments, the perforations 116 can each be characterized by a lateral dimension D equal to or greater than a flame quenching distance.

The quenching distance is evaluated under stoichiometric conditions. It is generally considered a property of the fuel and exists as a tabulated property. Most hydrocarbons have quenching distances of about 0.1". For example, NACA Lewis Report 1300 tabulates quenching distance as shown in Table 1.

The quenching distance represents the diameter of an orifice such that a stoichiometrically premixed flame cannot propagate upstream through the orifice into a premix chamber. The mechanism is essentially one of heat abstraction—the flame giving up too much energy as it attempts to flashback through the orifice. Since this is a thermal argument, actual flashback can occur through the quenching distance if the orifice is very hot—for example, if a premixed burner chamber is receiving radiant heat from a hot furnace, e.g., a premix burner in ethylene service. But even so, in general the quenching distance does not change dramatically inasmuch as the flow of premixed fuel and air tend to cool the orifice. According to one embodiment, the flame arrestor 111 is separated from the perforated reaction holder 102 by a distance $D_1$ so that the flame arrestor 111 maintains a temperature that is less than a temperature that substantially increases the quenching distance.

In contrast to the perforated flame holders 102 described herein, radiant burners that support surface combustion must have a minimum pore size less than the quenching distance for the particular fuel and temperature to avoid flashback, and it could be considered a tautology that if the flame flashes back, the pore size must be greater than the actual quenching distance under the operating conditions.

Quenching distances for several fuels under standard conditions are tabulated in Table 1, below.

TABLE 1

| FUEL QUENCHING DISTANCES | |
|---|---|
| HYDROCARBON FUEL | QUENCHING DISTANCE |
| n-Butane | 0.12" |
| Methane | 0.10" |
| Propane | 0.08" |
| Hydrogen | 0.025" |

The inventors found that for a given flow velocity, a larger dimension D in an elongated aperture (also referred to as a coarser mesh of a honeycomb flame holder) requires a larger length L of the perforation 116 in to reach the lowest NOx production. For tested combinations, the length L was equal to the distance between the input surface 118 and output surface 120 (also referred to as thickness $T_{RH}$) of the perforated reaction holder 102. Similarly, smaller D was found to operate effectively with a smaller perforation length L.

According to various embodiments, the perforations 116 of the perforated reaction holder 102 are configured to hold a flameless combustion reaction supported by the fuel and oxidant mixture substantially within the perforated reaction holder body 114.

A flameless combustion reaction refers to a combustion reaction that occurs volumetrically within the perforations such that no stoichiometric edge between a fuel-rich region and an oxidant-rich region exists. In a normal flame, the visible edge of the flame represents a stoichiometric surface. Since a stoichiometric mixture burns hotter than fuel-lean and fuel-rich mixtures, and since the production of NOx is a function of combustion temperature, eliminating the hot, visible stoichiometric surface results in a significant reduction in [NOx] (NOx concentration) in the combustion products. In one embodiment, the combustion temperature and the NOx concentration is reduced by premixing the fuel source 103 with the oxidant source 105 in the premix chamber 107 prior to delivering the oxidant-fuel mixture flow 112 to the perforated reaction holder 102.

FIG. 7A is a partial side sectional view of a furnace 700 including a perforated reaction holder 102, according to an embodiment. As used herein, the term furnace refers to a fuel combustion heater used for a wide range of industrial, commercial, and domestic applications such as steam generation for heating, propulsion, and generation of electricity; process heating used in oil refineries and other chemical plants such as for heating endothermic reactions, cracking petroleum, and heating distillation columns; metallurgical refining and production heating; kiln firing; and residential air and water heating systems. Other uses of furnaces will be apparent to those skilled in the art. Unless dictated to the contrary by context, furnace may be regarded as synonymous with burner or combustor.

According to an embodiment, the furnace 700 includes a premix chamber 107 disposed to output pre-mixed fuel and air into a combustion volume 108 to form the oxidant-fuel mixture flow 112. A perforated reaction holder 102 is disposed in the combustion volume 108, the perforated reaction holder 102 includes a perforated reaction holder body 114 defining a plurality of perforations 116 aligned to receive the oxidant-fuel mixture flow 112 from the premix chamber 107 through the flame arrestor 111. A perforated reaction holder support structure 708 is configured to support the perforated reaction holder 102 at a distance $D_1$ from the flame arrestor 111 to reduce radiative heating of the flame arrestor 111.

The perforations 116 can be configured to collectively hold a major portion of a combustion reaction (e.g., see FIG. 2, 208) supported by the oxidant-fuel mixture flow 112.

Holding the major portion of the combustion reaction 208 can include causing over half of total heat produced by the combustion reaction 208 to be produced between an input surface 118 and an output surface 120 of the perforated reaction holder 102. In another embodiment, holding the major portion of the combustion reaction 208 can include causing at least 80% of total heat produced by the combustion reaction 208 to be produced between an input surface 118 and an output surface 120 of the perforated reaction holder 102. In another embodiment, holding the major portion of the combustion reaction 208 comprises causing at least 98% of total heat produced by the combustion reaction 208 to be produced between an input surface 118 and an output surface 120 of the perforated reaction holder 102.

Holding the major portion of the combustion reaction 208 can include converting of over half of consumed fuel to combustion products $CO_2$ and $H_2O$ within the perforations 116. In another embodiment, holding the major portion of the combustion reaction 208 can include converting at least 80% of consumed fuel to combustion products $CO_2$ and $H_2O$ within the perforations 116. In another embodiment, holding the major portion of the combustion reaction 208 can include converting at least 98% of consumed fuel to combustion products $CO_2$ and $H_2O$ within the perforations 116.

Holding the major portion of the combustion reaction 208 can include supporting combustion such that visible flame extension 208p from an input surface 118 of the perforated flame holder toward the flame arrestor 111 is less in distance than a thickness $T_{RH}$ of the perforated reaction holder 102. In another embodiment, holding the major portion of the combustion reaction 208 can includes supporting combustion such that visible flame extension 208d from an output surface 120 of the perforated flame holder away from the flame arrestor 111 is less in distance than three times a thickness $T_{RH}$ of the perforated reaction holder 102. In another embodiment, holding the major portion of the combustion reaction 208 can include supporting combustion such that visible flame extension 208d from an output surface 120 of the perforated flame holder away from the flame arrestor 111 is less in distance than a thickness $T_{RH}$ of the perforated reaction holder 102.

Figure 7B:
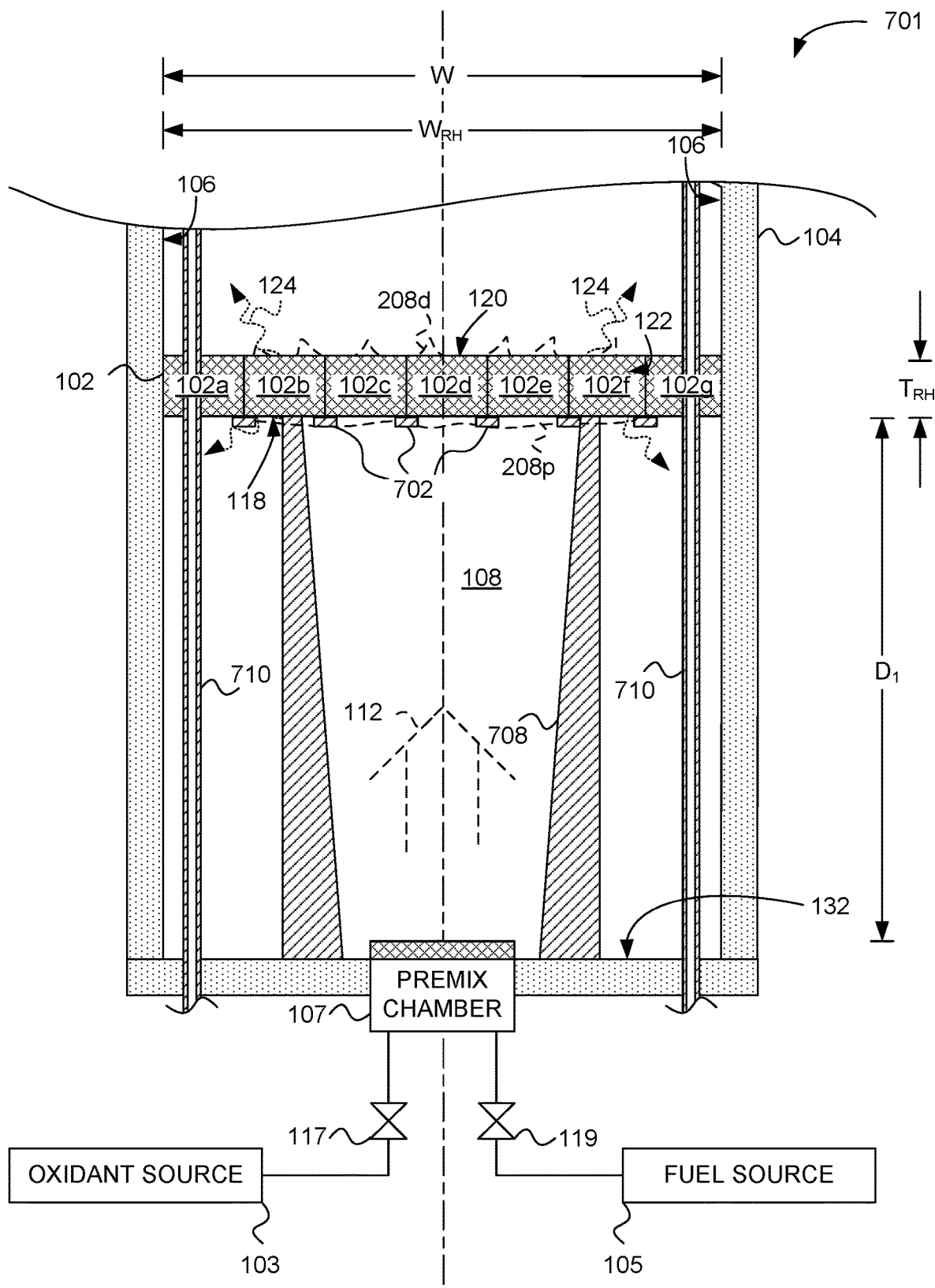
FIG. 7B is a simplified side sectional view of a furnace including a perforated reaction holder, according to another embodiment.

Referring to FIG. 7B, the furnace 701 can further include furnace walls 106 defined by a furnace body 104, the furnace walls 106 defining the combustion volume 108 having a lateral extent W, according to an embodiment. The perforated reaction holder 102 can have a lateral extent $W_{RH}$ defined by a peripheral wall 122. The lateral extent $W_{RH}$ of the perforated reaction holder 102 can be substantially equal to the lateral extent W of the combustion volume 108.

Referring to FIG. 7A, the furnace 700 can further include furnace walls 106 defined by a furnace body 104, the furnace walls 106 defining the combustion volume 108 having a lateral extent W. The perforated reaction holder 102 can have a lateral extent $W_{RH}$ defined by a peripheral wall 122. The lateral extent $W_{RH}$ of the perforated reaction holder 102 is less than the lateral extent W of the combustion volume 108. A region between the peripheral wall 122 of the perforated reaction holder 102 and the walls 106 of the combustion volume 108 can be selected to allow natural circulation of flue gas 712 from a region of the combustion volume 108 distal from a region between the flame arrestor 111 and the perforated reaction holder 102 to a region of the combustion volume 108 between the flame arrestor 111 and the perforated reaction holder 102.

The premix chamber 107 can be configured to output the fuel and air such that flue gas 712 is entrained in the oxidant-fuel mixture flow 112 as the fuel and air traverse the distance $D_1$ between the flame arrestor 111 and the perforated reaction holder 102.

An embodiment can further include a furnace floor 132 defined by a furnace body 104. The support structure 708 can be configured to support the perforated reaction holder 102 from the combustion volume floor 132.

The perforated reaction holder 102 can include a plurality of sections 102a, 102b, 102c, 102d. A perforated reaction holder section support structure 702 can be included and operatively coupled to the perforated reaction holder support structure 708. The perforated reaction holder section support structure 702 can be configured to support the sections 102a, 102b, 102c, 102d forming the perforated reaction holder 102.

The perforated reaction holder section support structure 702 can include a metal superalloy. For example, the perforated reaction holder section support structure 702 can include Inconel. In another embodiment, the perforated reaction holder support structure 708 can include a refractory brick.

According to an embodiment, the furnace 700, 701 can further include a furnace body 104 defining furnace walls 106, the furnace walls comprising a nonmetallic refractory material; and a plurality of radiant section working fluid tubes 710 disposed between the perforated reaction holder peripheral surface 122 and the furnace walls 106. The perforated reaction holder can be configured to emit thermal radiation 124 to heat the plurality of radiant section working fluid tubes 710 and the furnace walls 106. In another embodiment (not shown) the furnace body 104 can include "water walls" that include tubes for circulating a working fluid in the walls. This approach is typical for water-tube boilers used in large applications such as power generation.

Figure 8:
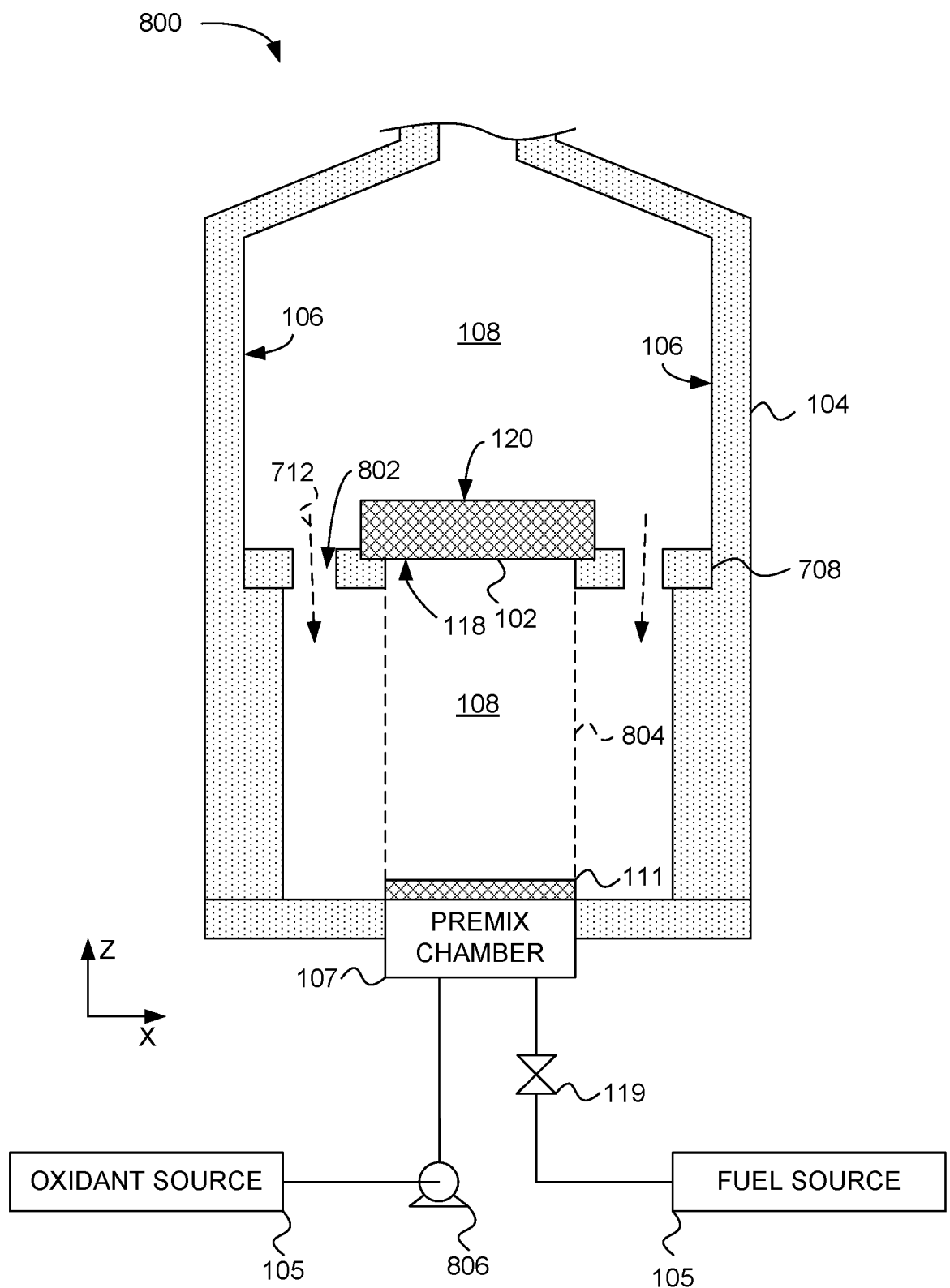
FIG. 8 is a side sectional view of a portion of a furnace, including perforated reaction holder, according to another embodiment.

FIG. 8 is a side sectional view of a furnace 800 including a perforated reaction holder support structure 708 that is supported from furnace walls 106, according to an embodiment.

The furnace 800 including a perforated reaction holder support structure 708 that is supported from furnace walls 106 further includes a furnace body 104 defining furnace walls 106. The perforated reaction holder support structure 708 can be supported from the furnace walls 106.

The perforated reaction holder support structure 708 can define apertures 802 selected to allow natural circulation of flue gas 712 from a region of the combustion volume 108 distal from a region between the flame arrestor 111 and the perforated reaction holder 102 to a region of the combustion volume 108 between the flame arrestor 111 and the perforated reaction holder 102. According to one embodiment, the premix chamber 107 delivers the oxidant-fuel mixture in an oxidant-fuel mixture flow 804 that is neither convergent nor divergent, but that flows vertically to the perforated reaction holder 102. According to one embodiment, the oxidant source 105 is delivered to the premix chamber 107 through a pump 806 that is operably coupled between the oxidant source 105 and the premix chamber 107.

Figure 9A:
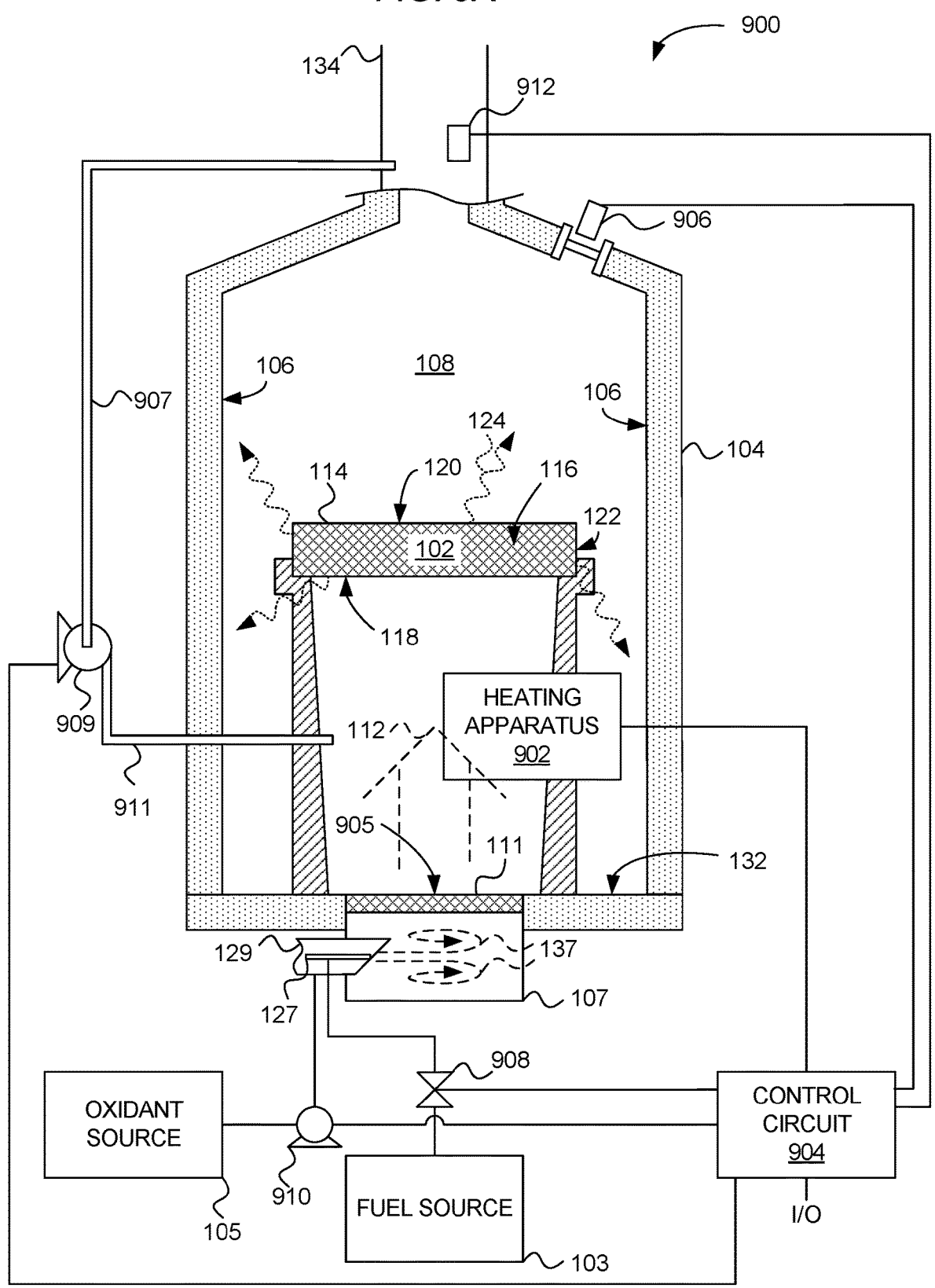
FIG. 9A is diagram of a combustion system including a perforated reaction holder and a premix fuel and oxidant source, according to an embodiment.

FIG. 9A is a diagrammatic depiction of a combustion system 900, according to an embodiment. The combustion system 900 includes a heating apparatus 902 for preheating the perforated reaction holder 102 and for preheating the oxidant-fuel mixture flow 112, according to one embodiment. The perforated reaction holder 102 can be aligned to receive the oxidant-fuel mixture flow 112 across an input surface 118, including a plurality of perforations 116. The perforated reaction holder 102 is configured to support a combustion reaction supported by the oxidant-fuel mixture flow 112 in the plurality of perforations 116 after the heating apparatus 902 preheats the perforated reaction holder 102. The combustion system 900 can also include a flame arrestor 111 that is proximate to the combustion volume floor 132 and that is optionally coupled to the premix chamber 903. The premix chamber 903 can be configured to receive the fuel source 103 and the oxidant source 105, in response to the fuel and oxidant being selectively injected into the premix chamber 903 by use of an optional control circuit 904. For example, the control circuit 904 can be operably coupled to a valve 908 and a blower 910 to selectively control volumes of fuel and oxidant that are injected into the premix chamber 903. According to one embodiment, the premix chamber 903 receives fuel from a fuel inlet 127 and an oxidant inlet 129 which are configured to premix the oxidant and fuel as described in FIG. 1C and the corresponding description, e.g., the oxidant and fuel mix in a pair of counter-rotating vortices 137. According to one embodiment, the oxidant inlet 129 is terminated at an angle that directs the incoming fuel and oxidant into the premix chamber 903 away from the opening 905 for the premix chamber 903, to improve the mixing of the fuel and oxidant and to remove and/or destroy any Taylor layers between the fuel and oxidant.

The combustion system 900 may also include a pipe 907, a pump 909, and a pipe 911 for recirculating flue gas from the exhaust flue 134 into the combustion volume 108 to perform one or more of the following: preheat the oxidant-fuel mixture flow 112, dilute the oxidant-fuel mixture flow 112, and burn remnant combustibles within the flue gas, according to one embodiment.

Figure 9B:
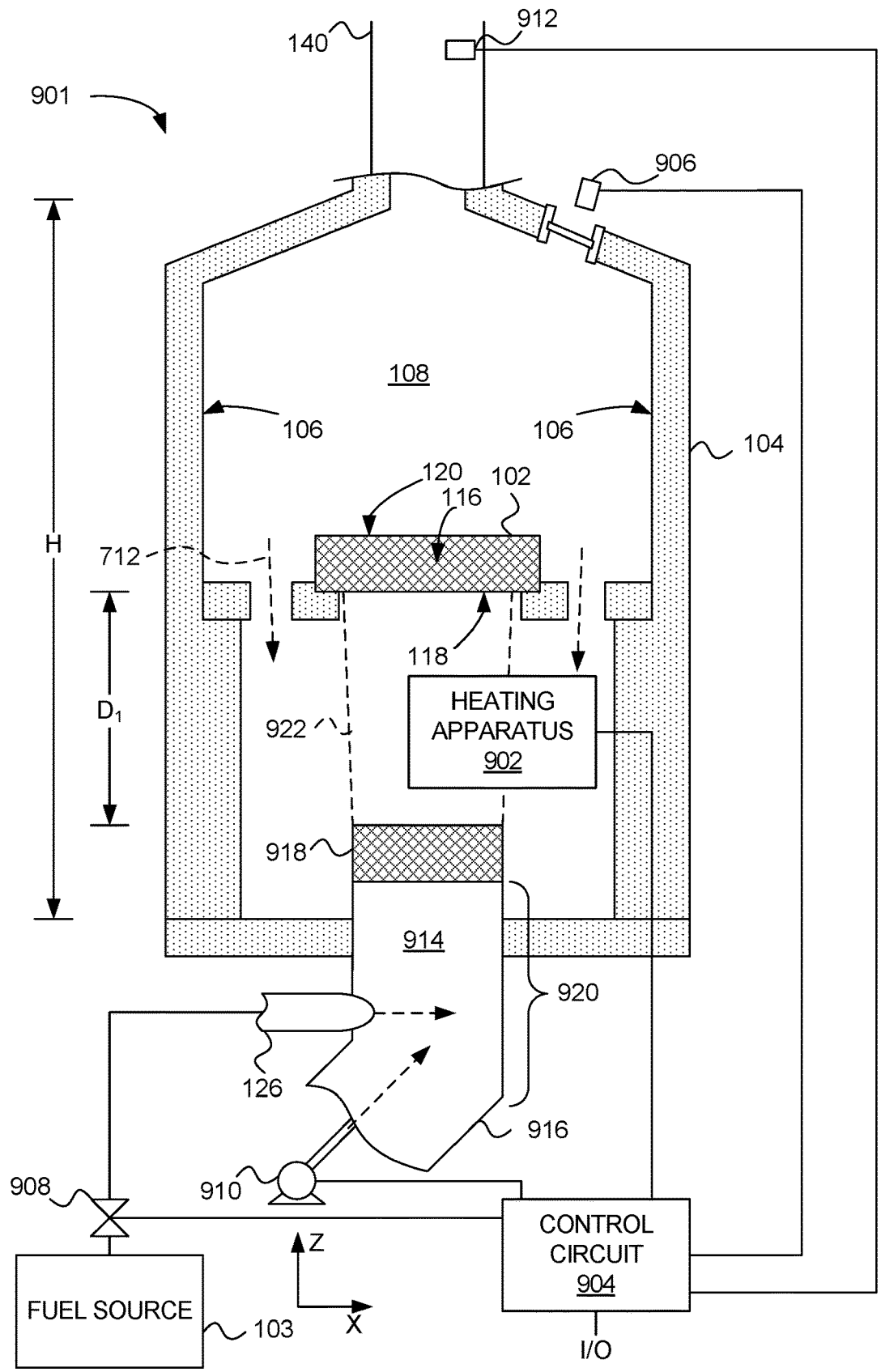
FIG. 9B is a diagram of a combustion system including a perforated reaction holder and a premix fuel and oxidant source, according to an embodiment.

FIG. 9B is a diagrammatic depiction of a combustion system 901 including a premix fuel and oxidant source 920, according to an embodiment. The premix fuel and oxidant source 920 may be a fuel and oxidant source. The premix fuel and oxidant source 920 is configured to output a premixed oxidant-fuel mixture flow 922 into the combustion volume 108. A perforated reaction holder 102 includes an input surface 118 aligned to receive the premixed stream of fuel and air. The perforated reaction holder 102 includes a plurality of perforations 116 having openings distributed across the input surface 118, the plurality of perforations being collectively configured to support a combustion reaction.

The premix fuel and oxidant source 920 can include a premix chamber 914, a fuel nozzle 126 configured to output fuel into the premix chamber 914, and an air channel 916 configured to inject combustion air into the premix chamber 914. The air channel 916 may immediately couple to the premix chamber 914 at a variety of angles to maintain mixture between the fuel and the oxidant injected into the fuel and oxidant source 920, while imparting forward momentum on the mixture. For example, the air channel 916 may join with the premix chamber 914 at a 30 degree angle of incidence, a 45 degree angle of incidence, a 90 degree angle of incidence with respect to a longitudinal axis of the premix chamber 914. In other words, the air channel 916 may be canted at an angle between 0-90 degrees with respect to a longitudinal axis of the premix chamber 914, according to one embodiment. A flame arrestor 918 can be configured to prevent flame flashback into the premix fuel and oxidant source 920.

According to an embodiment, the perforated reaction holder 102 is disposed a first distance $D_1$ from the flame arrestor 918, sufficient to prevent radiation heating of the flame arrestor 918 that may reduce the effectiveness of the flame arrestor 918 in stopping flame propagation into the premix chamber 914.

According to an embodiment, the perforated reaction holder 102 is disposed away from walls 106 of the combustion volume 108. The separation of the perforated reaction holder 102 from the walls of the combustion volume 108 provides a channel for natural flue gas circulation 712 from a portion of the combustion volume above an output surface 120 of the perforated reaction holder 102 to a portion of the combustion volume 108 between the premix fuel and oxidant source 920 and the input surface 118 of the perforated reaction holder 102. The premix fuel and oxidant source 920 is configured to output an oxidant-fuel mixture flow 922 selected to at least partially entrain the circulated flue gas 712 prior to reaching the input surface 118 of the perforated flame holder.

Referring to FIGS. 9A and 9B, the combustion system 900, 901 can optionally include a control circuit 904 operatively coupled to the heating apparatus 902, the control circuit 904 being configured to cause the heating apparatus 902 to operate.

The control circuit 904 can further include a heat sensor 906 operatively coupled to the control circuit 904, the heat sensor 906 being configured to detect a temperature of the perforated reaction holder 102. The control circuit 904 can be configured to control the heating apparatus 902 responsive to input from the heat sensor 906. The control circuit can be configured to cause the heating apparatus 902 to maintain the temperature of the perforated reaction holder 102.

A fuel control valve 908 can be included and configured to control a flow of fuel from a fuel source 103 to the fuel and oxidant source 920, the fuel control valve being operatively coupled to the control circuit 904.

The control circuit 904 can further include a heat sensor 906 operatively coupled to the control circuit 904, the heat sensor 906 being configured to detect a temperature of the perforated reaction holder 102. The fuel control valve 908 can be configured to control a flow of fuel from a fuel source 103 to the fuel and oxidant source 920, the fuel control valve being operatively coupled to the control circuit 904. The control circuit 904 can be configured to control the fuel control valve 908 responsive to input from the heat sensor 906. The control circuit 904 can be configured to control the fuel control valve 908 to maintain an operating temperature of the perforated flame holder 102. The control circuit can be configured to control the heating apparatus 902 to heat the perforated reaction holder 102 to an operating temperature prior to controlling the fuel control valve 908 to cause output of the oxidant-fuel mixture flow 112, 922 to the perforated reaction holder 102.

A blower 910 can be included and operatively coupled to the control circuit 904 and configured to force air through the premix fuel and oxidant source 920.

The control circuit 904 can further include an oxygen sensor 912 disposed to detect oxygen concentration in an exhaust flue 134 and operatively coupled to the control circuit 904.

The configuration of the premix fuel and oxidant source 920 can be particularly advantageous when considering the potential consequences associated with inadequately mixing the fuel and oxidant prior to introduction at the input surface 118. For example, inadequately mixing the fuel and oxidant can result in maintaining Taylor layers between the pure fuel and the oxidant. As described above, the introduction of unmixed pure fuel, even in small amounts, can raise the temperature of the combustion reaction, thereby resulting in an increase of NOx byproducts. By introducing the oxidant and fuel from the same side of the premix chamber 914, the Taylor layers may be completely destroyed prior to delivering the oxidant-fuel mixture flow 112, 922 to the perforated reaction holder 102 for combustion, according to one embodiment.

Figure 10:
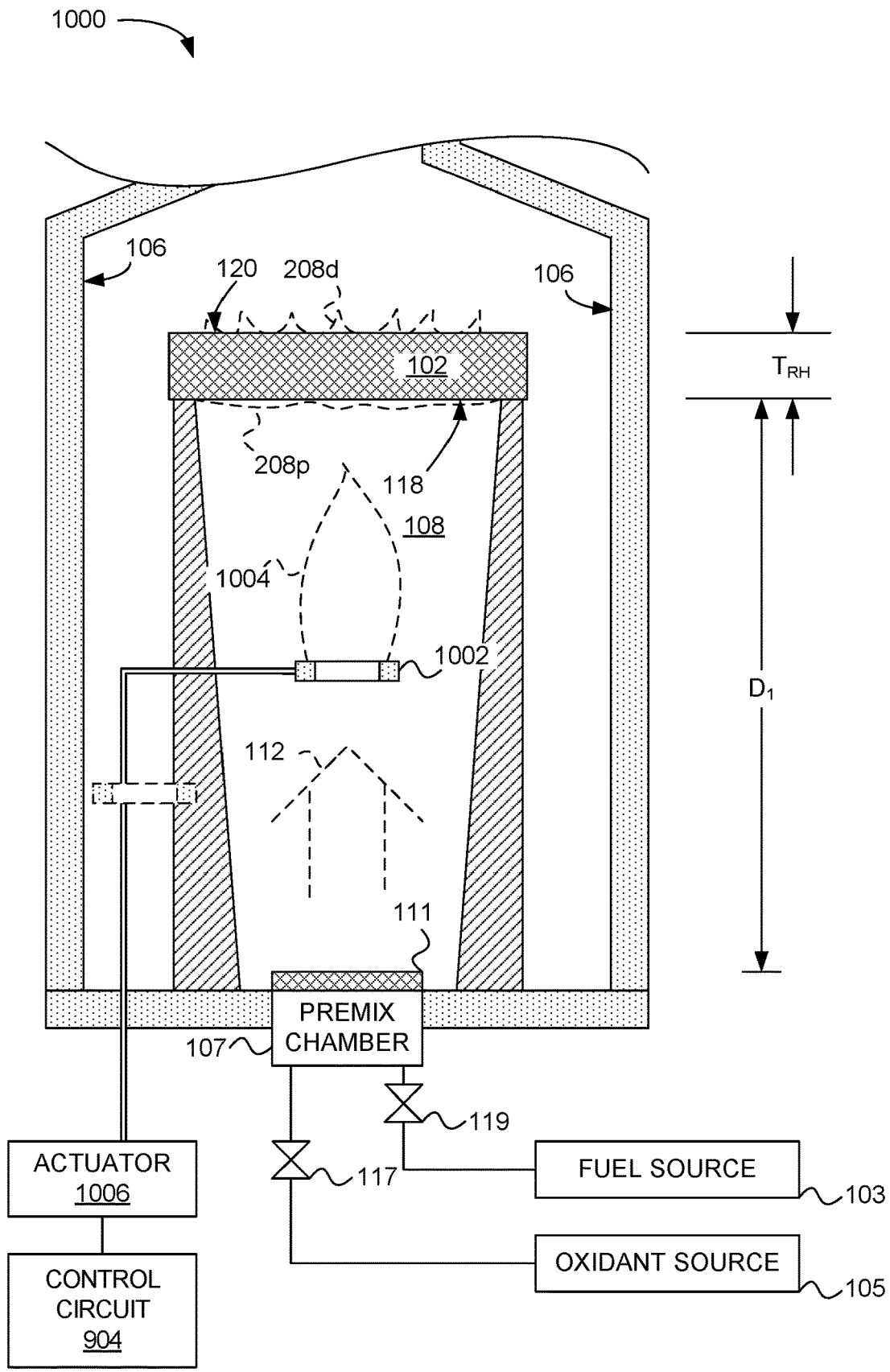
FIG. 10 is a sectional view of a portion of a combustion system, according to an embodiment.

Referring to FIG. 10, the heating apparatus 902 can include a flame holder 1002 configured to support a flame 1004 disposed to heat the perforated reaction holder 102, according to an embodiment.

The premix chamber 107 can be configured to receive an oxidant from an oxidant source 105 and a fuel from a fuel source 103 and can be configured to premix the fuel and oxidant to deliver the oxidant-fuel mixture flow 112 to the perforated reaction holder 102, through the flame arrestor 111.

The heating apparatus 1000 can further include a control circuit 904 and a flame holder actuator 1006 operatively coupled to the control circuit 904 and the flame holder 1002. The control circuit 904 can be configured to cause the flame holder actuator 1006 to cause the flame holder 1002 to not hold the flame 1004 when the perforated flame holder 102 is at an operating temperature.

Figure 11:
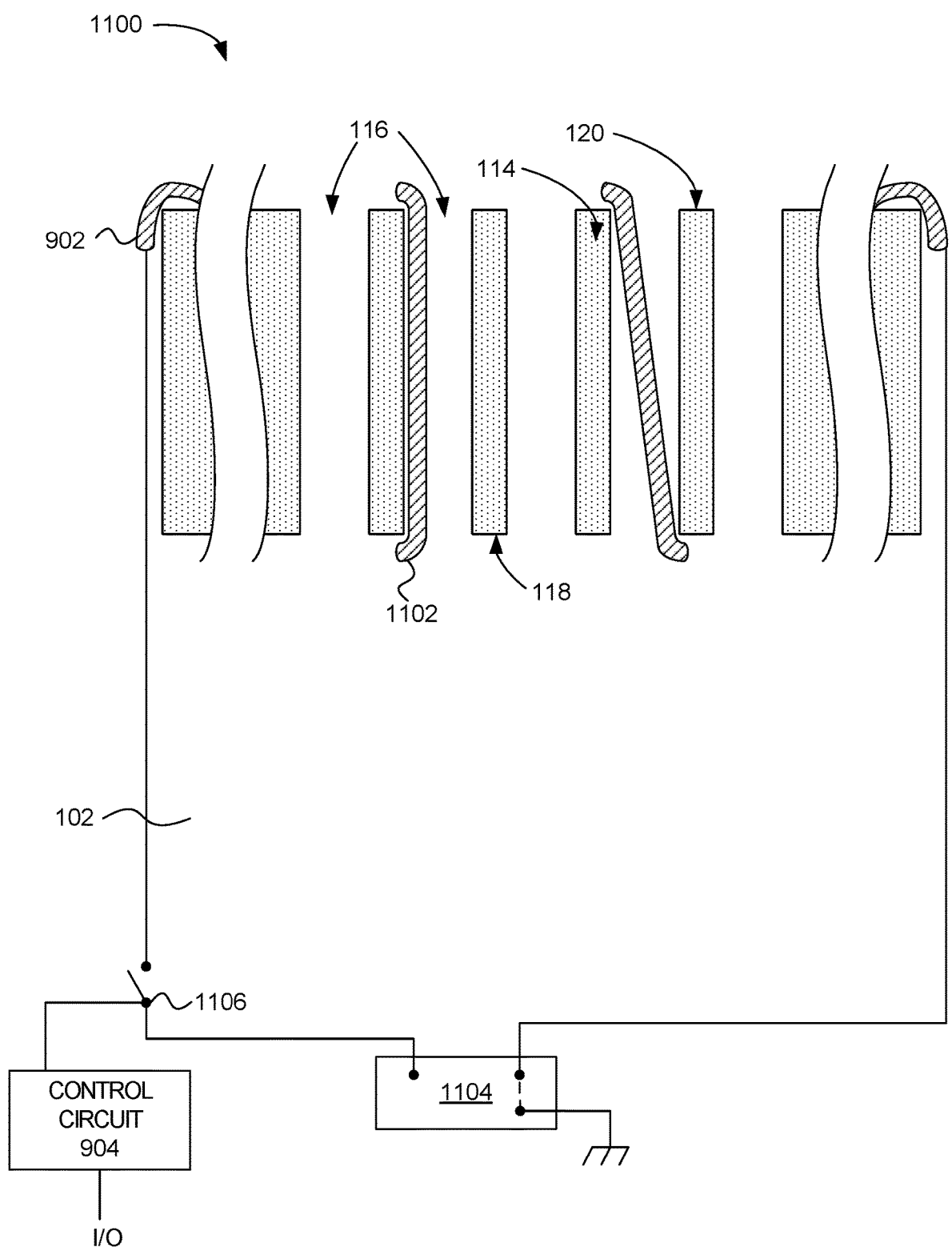
FIG. 11 simplified sectional view of a perforated reaction holder including a heating apparatus and a block diagram of other related apparatuses, according to an embodiment.

FIG. 11 is a side sectional diagram 1100 of a portion of a perforated flame holder 102 equipped with a heating apparatus 902 including an electrical resistance heater 1102 configured to output heat to the perforated flame holder 102, according to an embodiment. The heating apparatus 902 can include an electrical resistance heater 1102 operatively coupled to the perforated reaction holder 102. The electrical resistance heater 1102 can be configured to heat up the perforated reaction holder 102 to an operating temperature. Additionally or alternatively, the electrical resistance heater 1102 can be configured to heat the perforated reaction holder 102 to prevent the perforated reaction holder 102 from falling below an operating temperature.

The heating apparatus 902 can further include a power supply 1104 and a switch 1106 operable to selectively couple the power supply 1104 to the electrical resistance heater 1102. The heating apparatus 902 can further include a control circuit 904 operatively coupled to the switch 1106. The control circuit 904 can be configured to control the switch to selectively couple the power supply 1104 to the electrical resistance heater 1102. The control circuit 904 can optionally enable the electrical resistance heater 1102 during times of low fuel flow, in order to maintain the temperature of the perforated flame holder 102 at a selected operating temperature.

The heating apparatus is further used for start-up. Upon receiving a start-up command via the control circuit 904, the switch 1106 can close for a period of time sufficient to heat the electrical resistance heater 1102 and portions of the perforated flame holder 102 adjacent to the electrical resistance heater 1102. The control circuit 904 can then open a fuel control valve (e.g., see FIGS. 9A, 9B, 908) to start combustion in the perforated reaction holder 102.

The electrical resistance heater 1102 can be formed in various ways. For example, the electrical resistance heater 1102 can be formed from KANTHAL® wire (available from Sandvik Materials Technology division of Sandvik AB of Hallstahammar, Sweden) threaded through at least a portion of elongated apertures formed by the perforated flame holder body 114. Alternatively, the heater 1102 can include an inductive heater, a high energy (e.g. microwave or laser) beam heater, a frictional heater, or other types of heating technologies.

In an embodiment using a 48 inch length of Kanthal wire threaded through the perforated flame holder 102, the controller can cause a power supply 1104 outputting 90 VAC into electrical continuity with the electrical resistance heater 1102 for about 45 seconds. After 45 seconds, the control circuit 904 can open a fuel valve (908, FIGS. 9A, 9B) and start a blower (910, FIGS. 9A, 9B) to deliver an air and fuel mixture to the perforated flame holder 102. After ignition of the fuel and air in the perforated flame holder 102, for example after about 95 seconds, the control circuit 904 opens the switch 1106 to stop outputting heat with the electrical resistance heater 1102. As the perforated reaction holder 102 heats up, the control circuit 904 then increases fuel and air flow to output a desired heat delivery value.

For embodiments using shorter lengths of Kanthal wire, heating voltage and/or heating time can be reduced. For embodiments using longer lengths of Kanthal wire, voltage and/or time can be increased above 90 V and 45 seconds.

Referring again to FIG. 10, the heating apparatus 902 (see FIGS. 9 and 11) can be operable as a start-up apparatus. The start-up apparatus can include a start-up flame holder 1002 configured to temporarily hold a start-up flame disposed to output heat to the perforated reaction holder 102. The start-up flame holder 1002 can include a bluff body configured to cause vortices to circulate heat to maintain the start-up flame 1004. The start-up flame holder 1002 can be configured to be mechanically retracted to a position that does not hold the start-up flame 1004 after the perforated reaction holder has reached an operating temperature. Additionally or alternatively, the start-up flame holder 1002 can be configured for manual actuation by a combustion system 900 operator.

The heating apparatus 902 can further include a flame charger disposed to output charges to the start-up flame 1004. The heating apparatus 902 can include a conductive body configured to attract the charges from the start-up flame 1004 to hold the start-up flame 1004 for outputting heat to the perforated reaction holder 102.

Referring to FIGS. 9A and 9B, the heating apparatus 902 can be a start-up apparatus. Other forms of start-up apparatuses 902 are contemplated. For example, the start-up apparatus 902 can include an electrical discharge igniter configured to output a pulsed ignition to the air and fuel. Additionally or alternatively, the start-up apparatus 902 can include a pilot flame apparatus disposed to ignite the oxidant-fuel mixture flow 112, 922 entering the perforated reaction holder 102. The electrical discharge igniter and/or pilot flame apparatus can be operatively coupled to an electronic controller configured to cause the electrical discharge igniter or pilot flame apparatus to maintain combustion of the oxidant-fuel mixture flow 112, 922 in the perforated reaction holder 102 before the perforated reaction holder 102 is heated sufficiently to maintain combustion. The start-up apparatus 902 can additionally or alternatively include a pilot flame apparatus.

Figure 12:
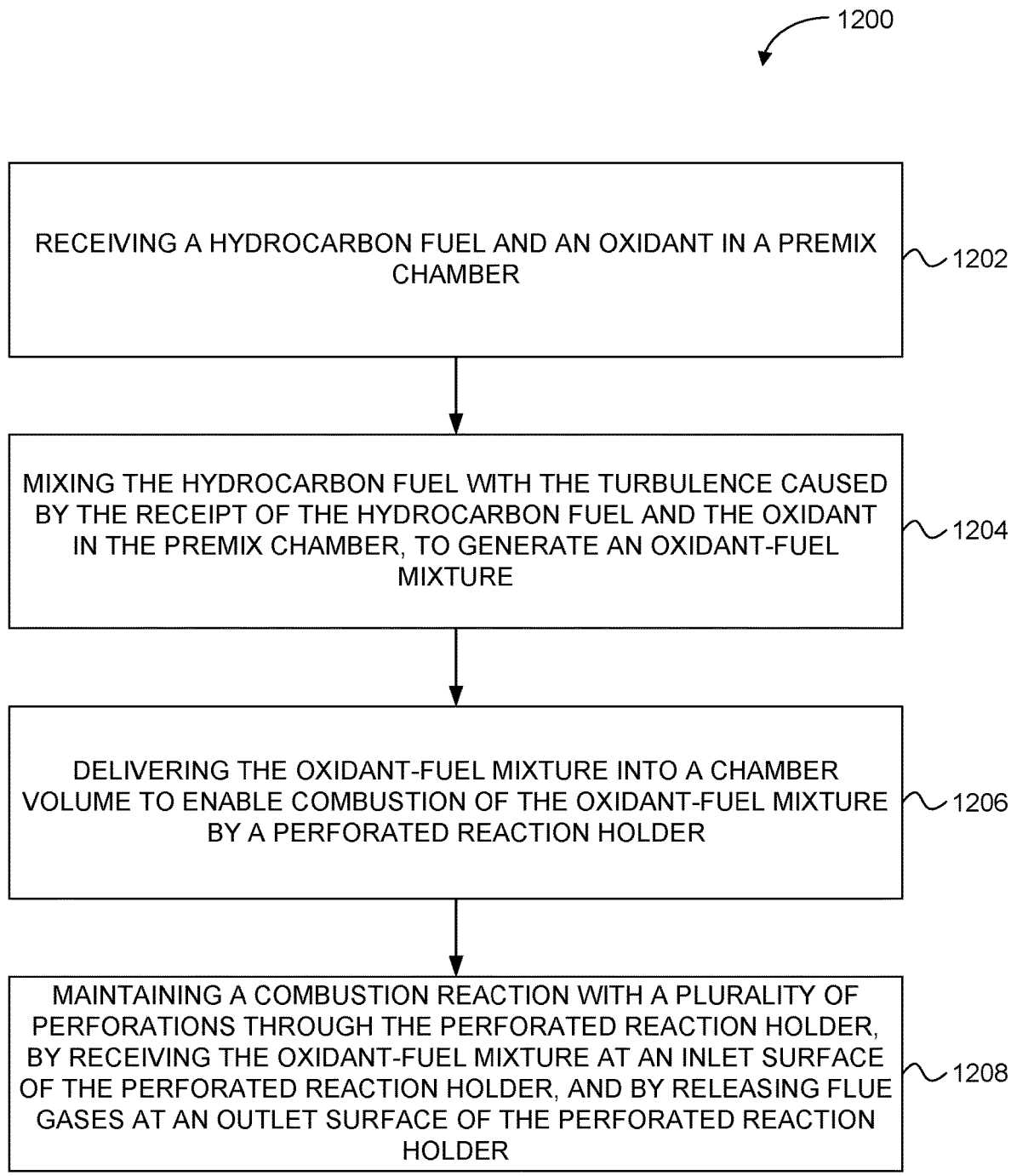
FIG. 12 is flow diagram of a method for generating a combustion reaction, according to an embodiment.

FIG. 12 illustrates a method 1200 of generating a combustion reaction having low NOx emissions, according to one embodiment.

At block 1202, the method includes receiving a hydrocarbon fuel and an oxidant in a premix chamber, according to one embodiment.

At block 1204, the method includes vortex mixing the hydrocarbon fuel and the oxidant in the premix chamber, to generate an oxidant-fuel mixture, according to one embodiment.

At block 1206, the method includes delivering the oxidant-fuel mixture into a chamber volume to enable combustion of the oxidant-fuel mixture by a perforated reaction holder, according to one embodiment. The perforated reaction holder can be separated from the premix chamber by a predetermined distance.

At block 1208, the method includes maintaining the combustion reaction with a plurality of perforations through the perforated reaction holder, by receiving the oxidant-fuel mixture at an inlet surface of the perforated reaction holder, and by releasing flue gases at an outlet surface of the perforated reaction holder, according to one embodiment.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:
a premix chamber configured to receive an oxidant and a fuel,
wherein the premix chamber is configured to provide an oxidant-fuel mixture into a chamber volume; and
a perforated reaction holder positioned within the chamber volume,
wherein the perforated reaction holder is displaced from the premix chamber and aligned with the premix chamber to receive the oxidant-fuel mixture;
wherein the perforated reaction holder carries a combustion reaction while at least part of the oxidant-fuel mixture combusts;
wherein the premix chamber is configured to receive an oxidant inlet extending at least partially into the premix chamber and a fuel inlet at least partially carried within the oxidant inlet; and
wherein the oxidant inlet is terminated, inside the premix chamber, at an angle that directs incoming fuel and oxidant away from an outlet of the premix chamber and causes the fuel stream and the oxidant stream to mix in a pair of counter-rotating vortices within the premix chamber mix prior to passing through the outlet.

2. The combustion system of claim 1, wherein a flame arrestor is positioned between the premix chamber and the perforated reaction holder.

3. The combustion system of claim 2, wherein the premix chamber includes an opening through which the oxidant-fuel mixture flows, and
wherein the flame arrestor entirely covers the opening.

4. The combustion system of claim 2, wherein the flame arrestor includes a mesh screen.

5. The combustion system of claim 2, wherein the flame arrestor includes at least one perforated metal sheet and is configured to prevent flashback into the premix chamber to least to 1600° F.

6. The combustion system of claim 1, wherein the premix chamber includes an opening through which the oxidant-fuel mixture flows,
wherein the premix chamber includes a chamber width and a chamber length, and
wherein the opening includes an opening width that is the same as the chamber width and includes an opening length that is the same as the chamber length.

7. The combustion system of claim 1, wherein the premix chamber includes an opening through which the oxidant-fuel mixture flows,
wherein the premix chamber includes a chamber width and a chamber length, and
wherein the opening includes an opening width that is shorter than the chamber width and includes an opening length that is shorter than the chamber length.

8. The combustion system of claim 1, further comprising:
a flame arrestor coupled to the premix chamber,
wherein the premix chamber includes a chamber width and a chamber length, and
wherein the flame arrestor includes an arrestor width that is the same as the chamber width and includes an arrestor length that is the same as the chamber length.

9. The combustion system of claim 1, further comprising:
a flame arrestor coupled to the premix chamber,
wherein the premix chamber includes an opening through which the oxidant-fuel mixture flows,
wherein the opening includes an opening width and an opening length, and
wherein the flame arrestor includes an arrestor width that is longer than the opening width and includes an arrestor length that is longer than the opening length.

10. The combustion system of claim 1, wherein the premix chamber is coupled to an oxidant source to receive the oxidant, and
wherein the oxidant source is a blower.

11. The combustion system of claim 1, wherein the fuel is a hydrocarbon gas.

12. The combustion system of claim 1, wherein the fuel is a vaporized hydrocarbon liquid.

13. The combustion system of claim 1, wherein the premix chamber includes an inlet aperture configured to receive both a fuel inlet and an oxidant inlet.

14. The combustion system of claim 13, wherein the fuel inlet is housed by the oxidant inlet while the oxidant inlet at least partially extends through the inlet aperture.

15. The combustion system of claim 13, wherein the oxidant inlet at least partially extends through the inlet aperture, and
wherein the fuel inlet and the oxidant inlet are configured to concurrently inject fuel and oxidant into the premix chamber through the inlet aperture.

16. A method of generating a combustion reaction, comprising:
receiving an oxidant in a premix chamber from an oxidant inlet extending at least partially into the premix chamber;
receiving a hydrocarbon fuel into the premix chamber from a fuel inlet at least partially carried within the oxidant inlet;
mixing the hydrocarbon fuel in the premix chamber, to generate an oxidant-fuel mixture, wherein the oxidant inlet terminates inside the premix chamber at an angle that directs incoming hydrocarbon fuel and oxidant away from an outlet of the premix chamber and causes a stream of the hydrocarbon fuel and a stream of the oxidant to mix in a pair of counter-rotating vortices within the premix chamber mix prior to passing through the outlet of the premix chamber;

delivering the oxidant-fuel mixture into a chamber volume to enable combustion of the oxidant-fuel mixture by a perforated reaction holder, wherein the perforated reaction holder is separated from the premix chamber by a predetermined distance; and maintaining the combustion reaction with a plurality of perforations through the perforated reaction holder, by receiving the oxidant-fuel mixture at an inlet surface of the perforated reaction holder, and by releasing flue gases at an outlet surface of the perforated reaction holder.

17. The method of claim 16, wherein maintaining the combustion reaction includes:

preheating the oxidant-fuel mixture proximate to the inlet surface of the perforated reaction holder; and combusting the oxidant-fuel mixture within at least some of the plurality of perforations between the inlet surface and the outlet surface of the perforated reaction holder.

18. The method of claim 17, wherein receiving includes:

receiving the hydrocarbon fuel and oxidant through an oxidant inlet operably coupled to an inlet aperture; and receiving the hydrocarbon fuel through a hydrocarbon fuel inlet that is at least partially housed within the oxidant inlet to enable the hydrocarbon fuel and the oxidant to concurrently flow into the premix chamber through the inlet aperture.

19. The method of claim 16, wherein delivering the oxidant-fuel mixture includes passing the oxidant-fuel mixture through a flame arrestor prior to exposing the perforated reaction holder to the oxidant-fuel mixture.

20. The method of claim 16, wherein receiving the hydrocarbon fuel and the oxidant in the premix chamber includes:

receiving the hydrocarbon fuel from a hydrocarbon fuel inlet that is coupled to a first side of the premix chamber; and receiving the oxidant from an oxidant inlet that is coupled to a second side of the premix chamber.

21. The method of claim 20, wherein the first side and the second side are on opposite sides of the premix chamber.

22. The method of claim 20, wherein the first side and the second side are a same side of the premix chamber.

23. The method of claim 16, wherein receiving the hydrocarbon fuel and the oxidant in the premix chamber includes concurrently receiving the hydrocarbon fuel and the oxidant to cause counter-rotational vortex mixing of the hydrocarbon fuel and the oxidant in the premix chamber.

24. The combustion system of claim 1, wherein the premix chamber is circular.

25. The method of claim 16, wherein the premix chamber is circular.

* * * * *